US 12,409,560 B2

(12) United States Patent
Hashimoto

(10) Patent No.: US 12,409,560 B2
(45) Date of Patent: Sep. 9, 2025

(54) WORK SYSTEM AND WORK METHOD

(71) Applicant: KAWASAKI JUKOGYO KABUSHIKI KAISHA, Kobe (JP)

(72) Inventor: Yasuhiko Hashimoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 227 days.

(21) Appl. No.: 18/034,261

(22) PCT Filed: Oct. 19, 2021

(86) PCT No.: PCT/JP2021/038649
§ 371 (c)(1),
(2) Date: Apr. 27, 2023

(87) PCT Pub. No.: WO2022/091882
PCT Pub. Date: May 5, 2022

(65) Prior Publication Data
US 2023/0390939 A1 Dec. 7, 2023

(30) Foreign Application Priority Data

Oct. 30, 2020 (JP) ................................ 2020-183354
Nov. 30, 2020 (JP) ................................ 2020-198394

(51) Int. Cl.
G06F 17/00 (2019.01)
B25J 5/00 (2006.01)
(Continued)

(52) U.S. Cl.
CPC ............... *B25J 11/008* (2013.01); *B25J 5/00* (2013.01); *B64D 1/02* (2013.01); *B64U 10/17* (2023.01);
(Continued)

(58) Field of Classification Search
CPC ... B25J 11/008; B25J 5/00; B25J 13/06; B25J 9/0084; B25J 9/0087; B25J 3/00;
(Continued)

(56) References Cited

U.S. PATENT DOCUMENTS 6,675,068 B1  1/2004 Kawasaki
2012/0125876 A1* 5/2012 Park ...................... B66C 23/207
212/312
(Continued)

FOREIGN PATENT DOCUMENTS

CA  2722748 A1 * 11/2009 ............ F03D 80/00
CN  108382591 A   8/2018
(Continued)

OTHER PUBLICATIONS

Drones (Year: 2022).*

*Primary Examiner* — Ronnie M Mancho
(74) *Attorney, Agent, or Firm* — Oliff PLC

(57) ABSTRACT

A work system which performs a work to a structure, and includes an aircraft, and a robot which performs the work to the structure. After the aircraft conveys the robot to the structure while holding the robot, the aircraft releases the robot after the aircraft lowers the robot onto the structure. The robot is released from the aircraft, and then performs the work to the structure.

10 Claims, 23 Drawing Sheets

(51) Int. Cl.
*B25J 11/00* (2006.01)
*B64D 1/02* (2006.01)
*B64U 10/17* (2023.01)
*B64U 20/00* (2023.01)
*H02G 1/02* (2006.01)
*B25J 13/06* (2006.01)
*B64U 101/30* (2023.01)
*B64U 101/60* (2023.01)
*B64U 101/67* (2023.01)

(52) U.S. Cl.
CPC ............. *B64U 20/00* (2023.01); *H02G 1/02* (2013.01); *B25J 13/06* (2013.01); *B64U 2101/30* (2023.01); *B64U 2101/60* (2023.01); *B64U 2101/67* (2023.01)

(58) Field of Classification Search
CPC ...... B25J 9/0009; B25J 9/1682; B25J 9/1689; B25J 13/00; B64D 1/02; B64D 1/22; B64D 1/10; B64U 10/17; B64U 20/00; B64U 2101/30; B64U 2101/60; B64U 2101/67; H02G 1/02; B64C 27/06
USPC ........................................................ 700/245
See application file for complete search history.

(56) References Cited

U.S. PATENT DOCUMENTS

| | | |
|---|---|---|
| 2019/0377346 A1 | 12/2019 | Freitas et al. |
| 2020/0175468 A1 | 6/2020 | Tsuruta et al. |
| 2024/0309854 A1 * | 9/2024 | Jensen .................. B64U 80/70 |

FOREIGN PATENT DOCUMENTS

| | | | | |
|---|---|---|---|---|
| CN | 111469114 A | * | 7/2020 | |
| CN | 108382591 B | * | 8/2020 | ............. B64C 39/02 |
| EP | 3238881 A1 | * | 11/2017 | ............. B25J 13/089 |
| JP | 2001-121459 A | | 5/2001 | |
| JP | 6371959 B2 | * | 8/2018 | ............. B25J 13/00 |
| JP | 2018-534953 A | | 11/2018 | |
| JP | 2020-083600 A | | 6/2020 | |
| KR | 101225691 B1 | * | 8/2018 | |
| KR | 101291120 B1 | * | 8/2018 | |
| KR | 101302990 B1 | * | 8/2018 | |
| KR | 101592904 B1 | * | 8/2018 | |
| WO | WO-2009132671 A2 | * | 11/2009 | ............. F03D 80/00 |
| WO | 2017/042551 A1 | | 3/2017 | |
| WO | WO-2022092262 A1 | * | 5/2022 | ............. B25J 19/005 |

* cited by examiner

WORK SYSTEM AND WORK METHOD

CROSS-REFERENCE TO RELATED APPLICATIONS

This is a U.S. National Phase of International Application No. PCT/JP2021/038649 filed Oct. 19, 2021, which claims the benefit of Japanese Application No. 2020-183354 filed Oct. 30, 2020 and Japanese Application No. 2020-198394 filed Nov. 30, 2020. The disclosure of the prior applications is hereby incorporated by reference herein in its entirety.

TECHNICAL FIELD

The present disclosure relates to a work system and a work method.

BACKGROUND ART

Conventionally, various kinds of work systems are known. As such a work system, there is a delivery system proposed in Patent Document 1, for example.

The delivery system of Patent Document 1 includes a vehicle which stores a package to be delivered to a specific user, and a movable body disposed at a delivery site of the package. The movable body includes a communicating part which transmits and receives given information, and a collection control part which performs a control in which, when the vehicle approaches the delivery site, the movable body moves toward the vehicle from the delivery site and collects the package, and it again moves to the delivery site.

REFERENCE DOCUMENT(S) OF CONVENTIONAL ART

Patent Document

[Patent Document 1] JP2020-083600A

SUMMARY OF THE DISCLOSURE

Problem to be Solved by the Disclosure

In Patent Document 1, it is described that, by having the above-described structure, the storage capacity for the packages can be increased at the vehicle end. However, Patent Document 1 does not take performing a work to a structure into consideration.

Thus, one purpose of the present disclosure is to provide a work system and a work method, capable of performing a work to a structure.

SUMMARY OF THE DISCLOSURE

In order to solve the above-described problem, a work system according to the present disclosure is a work system which performs a work to a structure, and includes an aircraft, and a robot which performs the work to the structure. After the aircraft conveys the robot to the structure while holding the robot, the aircraft releases the robot after the aircraft lowers the robot onto the structure. The robot is released from the aircraft, and then performs the work to the structure.

Effect of the Disclosure

According to the present disclosure, since the robot is conveyed by the aircraft to a structure, is lowered onto the structure from the aircraft and released from the aircraft, and then performs a work to the structure, the work system and the work method capable of performing the work to a structure is provided.

MODES FOR CARRYING OUT THE DISCLOSURE

Figure 1:
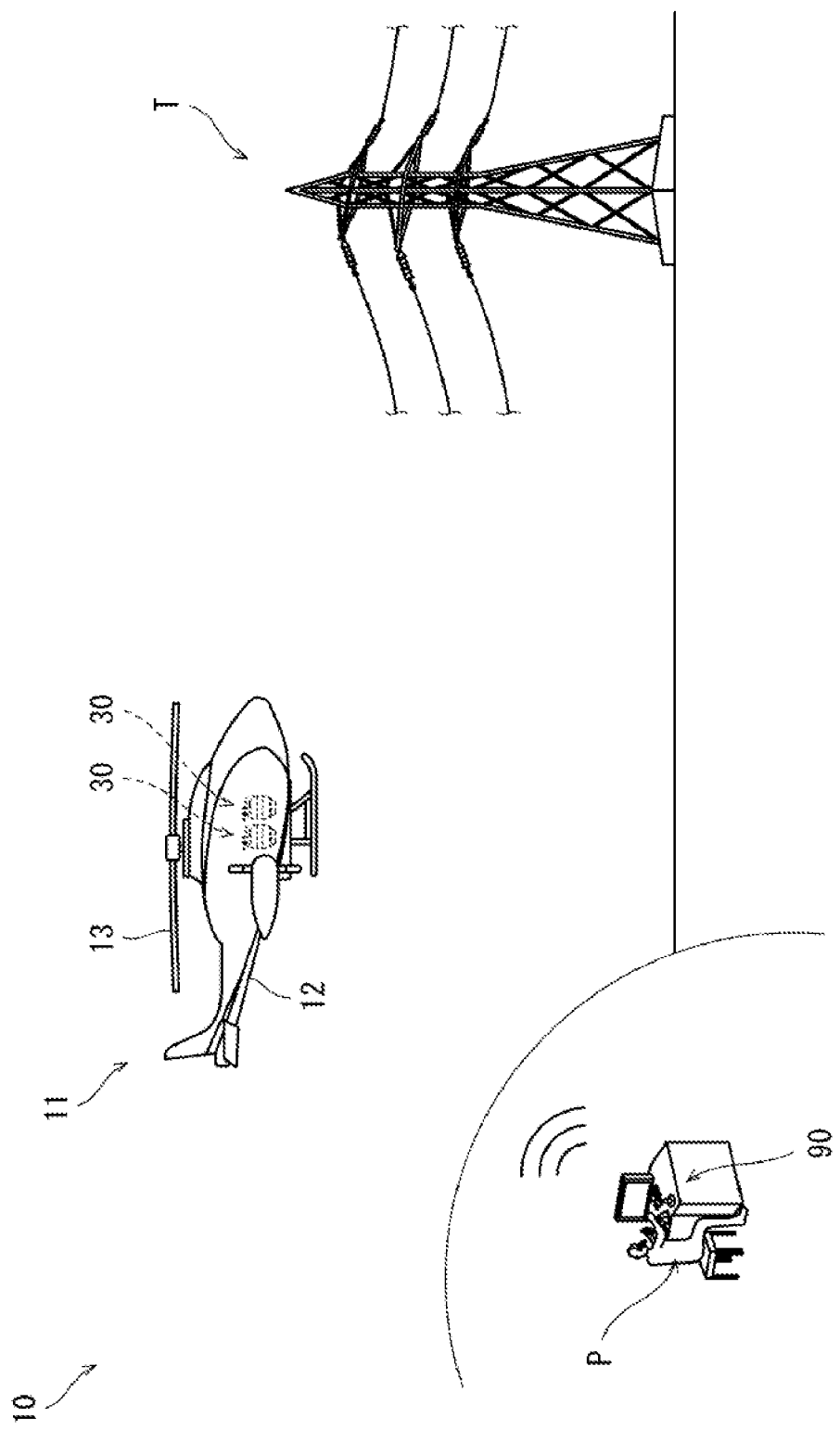
FIG. 1 is a schematic view illustrating the entire configuration of a work system according to one embodiment of the present disclosure.

Hereinafter, a work system according to one embodiment of the present disclosure is described with reference to the drawings. Note that the present disclosure is not limited by the present disclosure. Further, below, throughout the drawings, the same reference characters are assigned to the same or corresponding elements to omit redundant description.
(Work System 10)

FIG. 1 is a schematic view illustrating the entire configuration of a work system according to this embodiment. As illustrated in FIG. 1, a work system 10 includes a VTOL aircraft (Vertical Take-Off and Landing aircraft) 11 as an aircraft, and a robot 30 which performs a work to a steel tower T (structure). Further, the work system 10 is further provided with an interface 90 for an operator P to manipulate the VTOL aircraft 11 and the robot 30 by a remote control.

As illustrated in FIG. 1, the VTOL aircraft 11 includes a VTOL aircraft body 12, a propeller 13 attached to an upper part of the VTOL aircraft body 12, a winch 15 (see FIG. 3) provided inside the VTOL aircraft body 12, and a wire rope 16 (see FIG. 4) which is wound up by the winch 15. Further, the VTOL aircraft 11 is further provided with a VTOL control device 20 (see FIG. 3) which controls at least operation of the propeller 13 and the winch 15.

Figure 2:
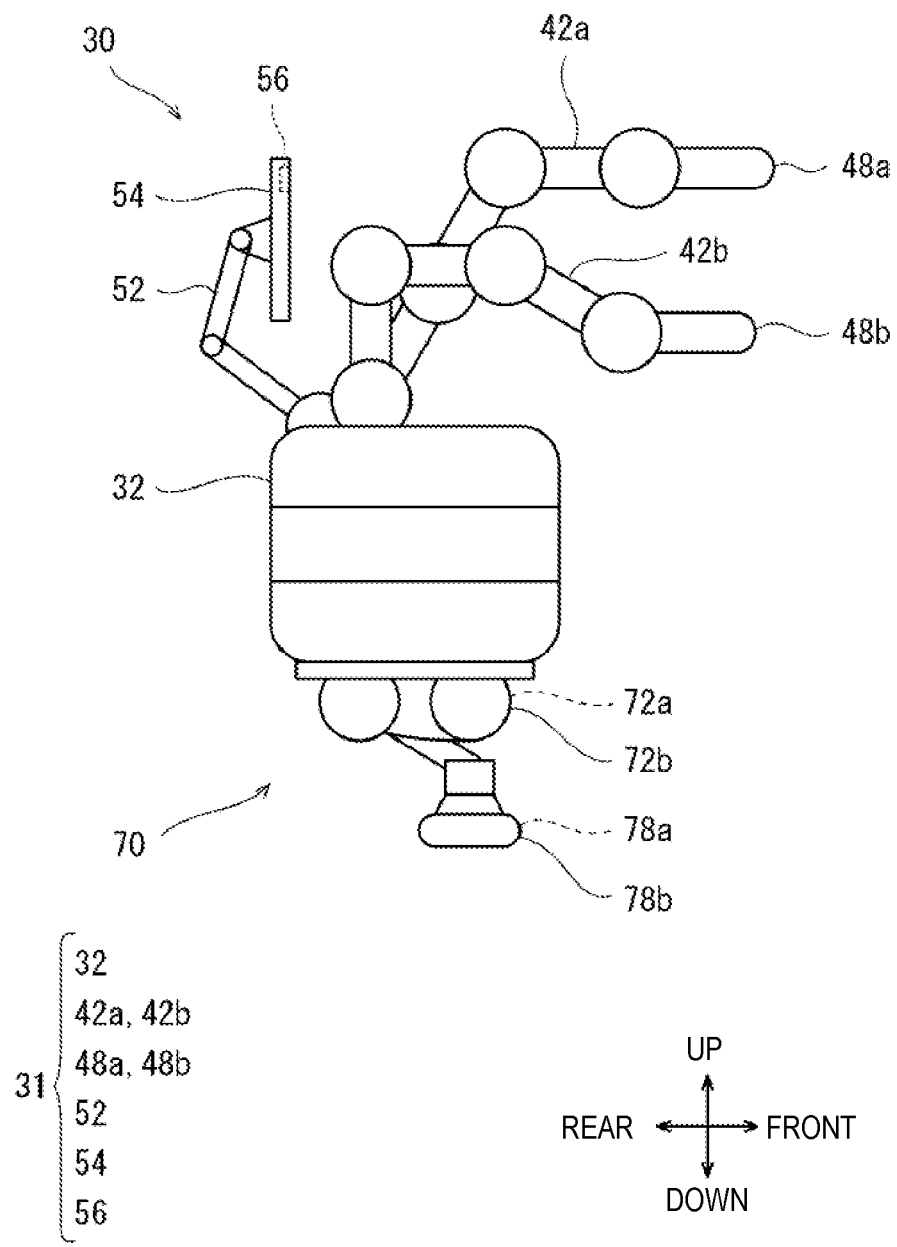
FIG. 2 is a schematic side view of a robot provided to the work system according to one embodiment of the present disclosure.

FIG. 2 is a schematic side view of a robot provided to the work system according to this embodiment. As illustrated in FIG. 2, the robot 30 includes a robot body 31 and a fixing device 70 which fixes the robot body 31 to the steel tower. The robot 30 further includes a robot control device 60 which controls at least operation of the robot body 50, the fixing device 70, and a camera 56 (described later). Note that the robot 30 may be configured to be travelable by itself by providing wheels (for example, four wheels) to a bottom part of a base 32, and providing a drive of the four wheels inside the base 32.

The robot body 31 includes the base 32, a pair of robotic arms 42a and 42b (first robotic arms) which are attached at their base-end parts to an upper surface of the base 32, and a pair of robot hands 48a and 48b (first robot hands) which are provided to tip ends of the pair of robotic arms 42a and 42b and perform a work to the steel tower T. The pair of robotic arms 42a and 42b are provided so as to be separated from each other in the left-and-right direction of the robot 30 perpendicular to the front-and-rear direction and the up-and-down direction which are illustrated in FIG. 2. The robot hand 48a is provided to the tip end of the robotic arm 42a, and the robot hand 48b is provided to the tip end of the robotic arm 42b.

Figure 14A:
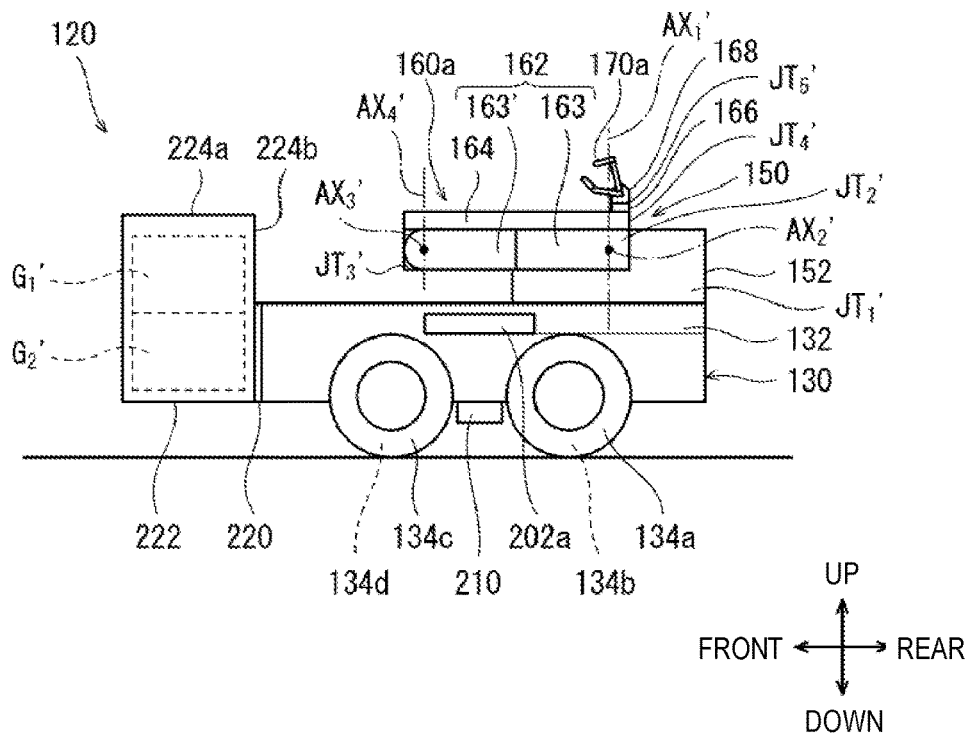
FIG. 14A is a schematic view illustrating the robot provided to the work system according to one embodiment of the present disclosure, and is a side view of a self-propelled robot which has a similar structure in part to the robot described above.
Figure 14B:
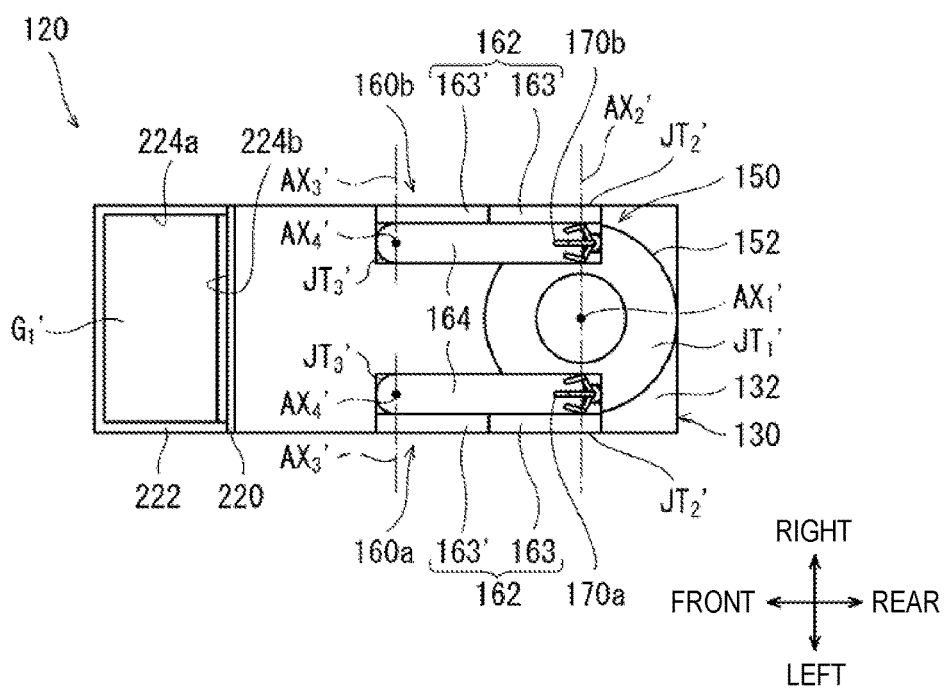
FIG. 14B is a schematic view illustrating the robot provided to the work system according to one embodiment of the present disclosure, and is a top view of the self-propelled robot which has a similar structure in part to the robot described above.

Note that, although the structures of the pair of robotic arms 40a and 40b and the pair of robot hands 48a and 48b are illustrated in a simplified fashion in FIG. 2 etc., they may have similar structures to a self-propelled robot 120 illustrated in FIGS. 14A and 14B. The detailed structure of the self-propelled robot 120 will be described later.

The robot body 31 further includes an auxiliary robotic arm 52 attached at its base-end part to a rear-end part of the upper surface of the base 32, a display 54 provided to a tip end of the auxiliary robotic arm 52, and the camera 56 provided to an edge part of the display 54. The base-end part of the auxiliary robotic arm 52 is provided between the pair of robot hands 48a and 48b in the left-and-right direction of the robot 30.

The fixing device 70 includes a pair of robotic arms 72a and 72b (second robotic arms) attached at their base-end parts to a bottom surface of the base 32, and a pair of robotic hands 78a and 78b (second robotic arms) provided to tip ends of the pair of robotic arms 72a and 72b. The robot hand 78a is provided to the tip end of the robotic arm 72a, and the robot hand 78b is provided to the tip end of the robotic arm 72b. The fixing device 70 fixes the robot body 31 to the steel tower T by the pair of robot hands 78a and 78b grasping (holding) a part of the steel tower T.

Note that, although the structures of the pair of robotic arms 160a and 160b and the pair of robot hands 68a and 68b are illustrated in a simplified fashion in FIG. 2 etc., they may have similar structures to the self-propelled robot 120 illustrated in FIGS. 14A and 14B. As described above, the detailed structure of the self-propelled robot 120 will be described later.

Figure 3:
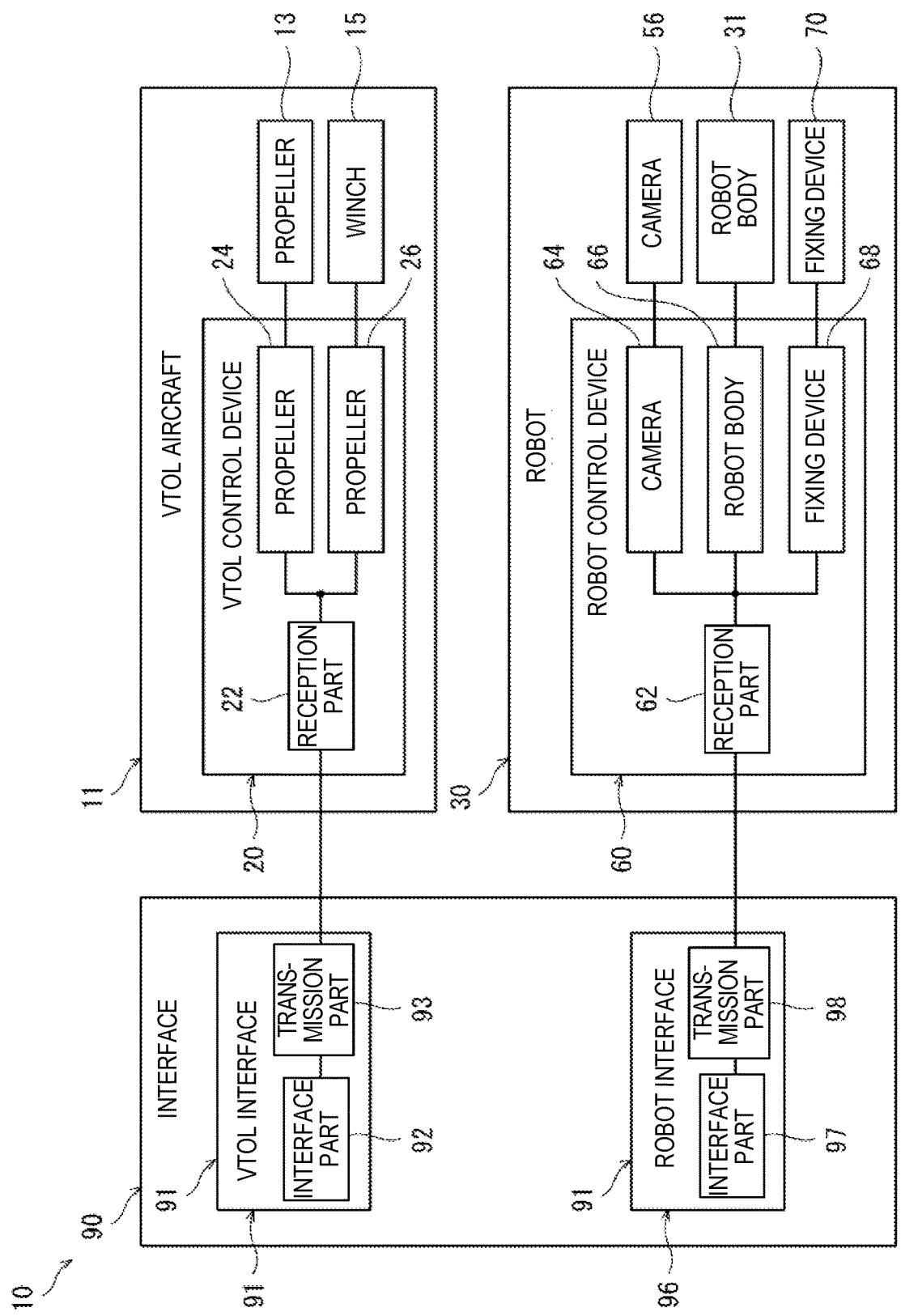
FIG. 3 is a block diagram illustrating a control system of the work system according to one embodiment of the present disclosure.

FIG. 3 is a block diagram illustrating a control system of the work system according to this embodiment. As illustrated in FIG. 3, the interface 90 includes a VTOL interface 91 for manipulating the VTOL aircraft 11 by a remote control, and a robot interface 96 for manipulating the robot 30 by a remote control.

The VTOL interface 91 includes an interface part 92 for accepting an operational input by the operator P, and a transmission part 93 for transmitting the operational input accepted by the interface part 92 to the VTOL aircraft 11, as a command value. Further, the robot interface 96 includes an interface part 97 for accepting an operational input by the operator P, and a transmission part 98 for transmitting the operational input accepted by the interface part 97 to the robot 30, as a command value.

The VTOL control device 20 includes a reception part 22 for receiving the command value transmitted from the transmission part 93 of the VTOL interface 91. Further, the VTOL control device 20 further includes a propeller control part 24 for controlling operation of the propeller 13 based on the command value received by the reception part 22, and a winch control part 26 for similarly controlling operation of the winch 15.

The robot control device 60 includes a reception part 62 for receiving the command value transmitted from the transmission part 98 of the robot interface 96. Further, the robot control device 60 further includes a camera control part 64 for controlling operation of the camera based on the command value received by the reception part 62, a robot control part 66 for similarly controlling operation of the robot body 31, and a fixing device control part 68 for similarly controlling operation of the fixing device 70.

(Work Mode of Work System 10)

Figure 4:
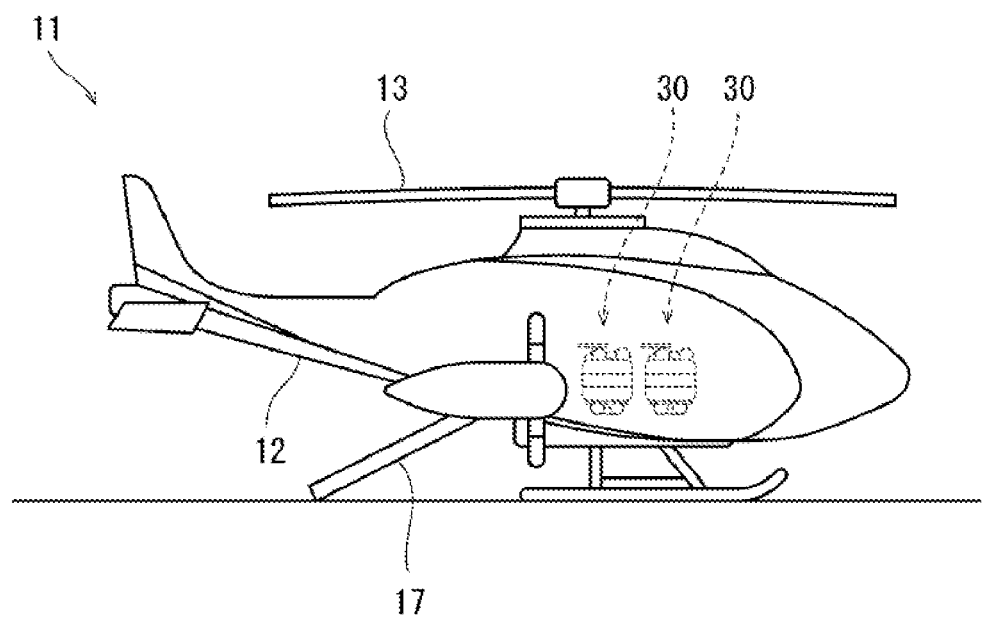
FIG. 4 is a schematic view illustrating a situation in which the work system according to one embodiment of the present disclosure stores a robot inside an aircraft.

Next, one example of a mode of a work which the work system 10 performs to the steel tower T is described mainly based on FIGS. 4 to 10. First, as illustrated in FIG. 4, the VTOL aircraft 11 and the two robots 30 are prepared, a storage door 17 provided to the VTOL aircraft body 12 is opened, and the robots 30 are stored inside the VTOL aircraft body 12.

At this time, the robots 30 may be stored inside the VTOL aircraft body 12 in a state where the pair of robotic arms 42a and 42b, the pair of robotic arms 72a and 72b, and the auxiliary robotic arm 52 are folded. For example, the robots 30 may be carried into the VTOL aircraft body 12 by manual labor. Alternatively, for example, the robots 30 may be configured to be travelable by themselves (self-propelled) so that they travel by themselves and are stored inside the VTOL aircraft body 12. At this time, the robots 30 may autonomously travel by themselves, or may travel by themselves by a remote control of the operator P.

Figure 5:
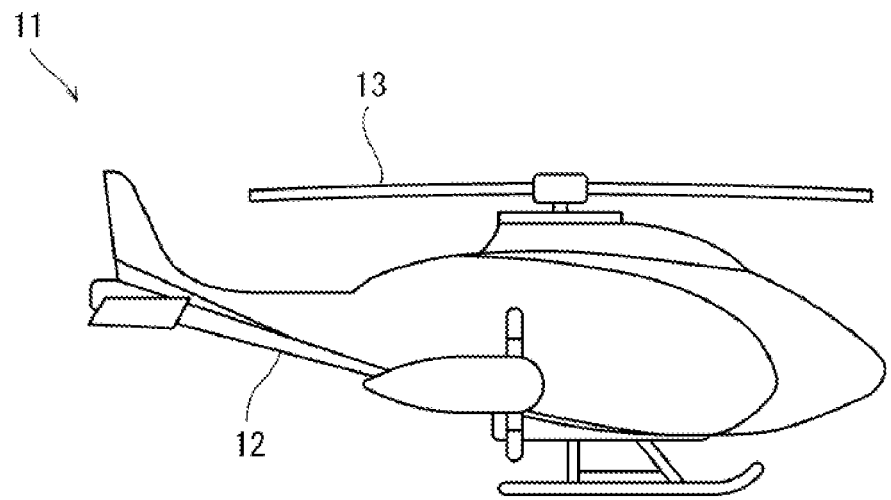
FIG. 5 is a schematic view illustrating a situation in which the work system according to one embodiment of the present disclosure conveys the robots above a structure by the aircraft.
Figure 5:
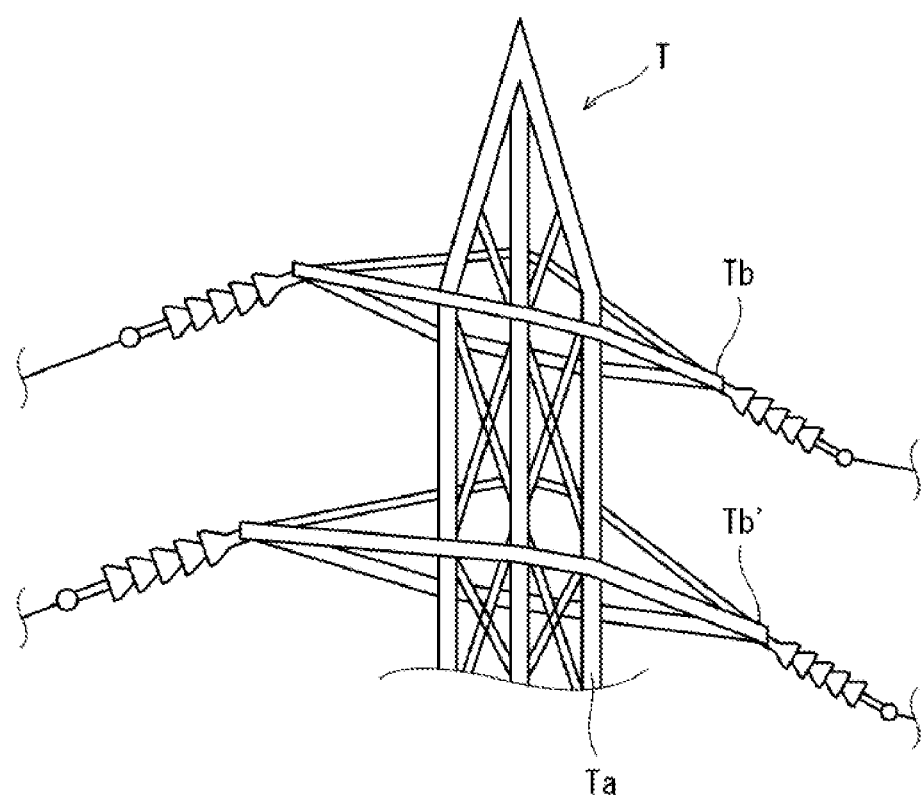

FIG. 5 is a schematic view illustrating a situation in which the work system according to this embodiment conveys the robots over a structure by the aircraft. As illustrated in FIG. 5, the VTOL aircraft 11 conveys the robots 30 over the steel tower T in a state where it stores the robots 30. FIG. 5 illustrates a state where the VTOL aircraft 11 hovers over the steel tower T in a state where it stores the robots 30.

As described above, the VTOL aircraft 11 may autonomously perform that the VTOL aircraft 11 conveys the robots 30 over the steel tower T (in other words, flies and moves from a location where it stores the robots 30 to a location above the steel tower T), and hovers over the steel tower T.

Figure 6:
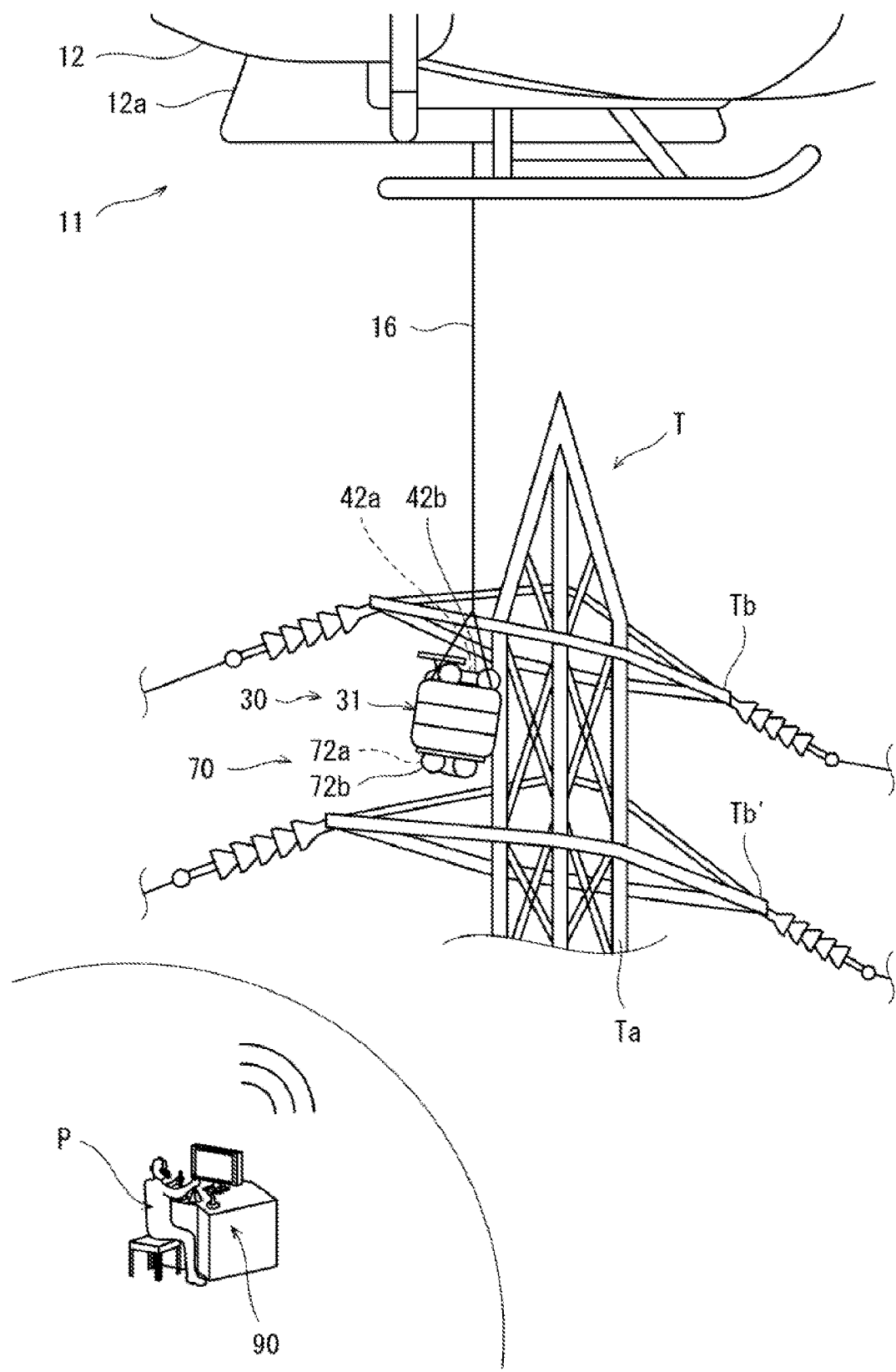
FIG. 6 is a schematic view illustrating a situation in which the work system according to one embodiment of the present disclosure lowers the robot onto the structure from the aircraft.

FIG. 6 is a schematic view illustrating a situation in which the work system according to this embodiment lowers the robot onto the structure from the aircraft. Next, as illustrated in FIG. 6, the VTOL aircraft 11 lowers one of the robots 30 on the steel tower T. In detail, the VTOL aircraft 11 opens a door 12a provided to the bottom part of the VTOL aircraft body 12 in the state where it hovers over steel tower T. Then, the wire rope 16 is unwound downwardly from the VTOL aircraft body 12 in a state where one robot 30 is attached to its tip end.

When the VTOL aircraft 11 lowers one robot 30 on the steel tower T as described above, for example, the VTOL aircraft 11 may autonomously perform that the VTOL aircraft 11 hovers over the robot 30, and the operator P may remotely perform using the interface 90 that the winch 15 unwinds the wire rope 16.

Figure 7:
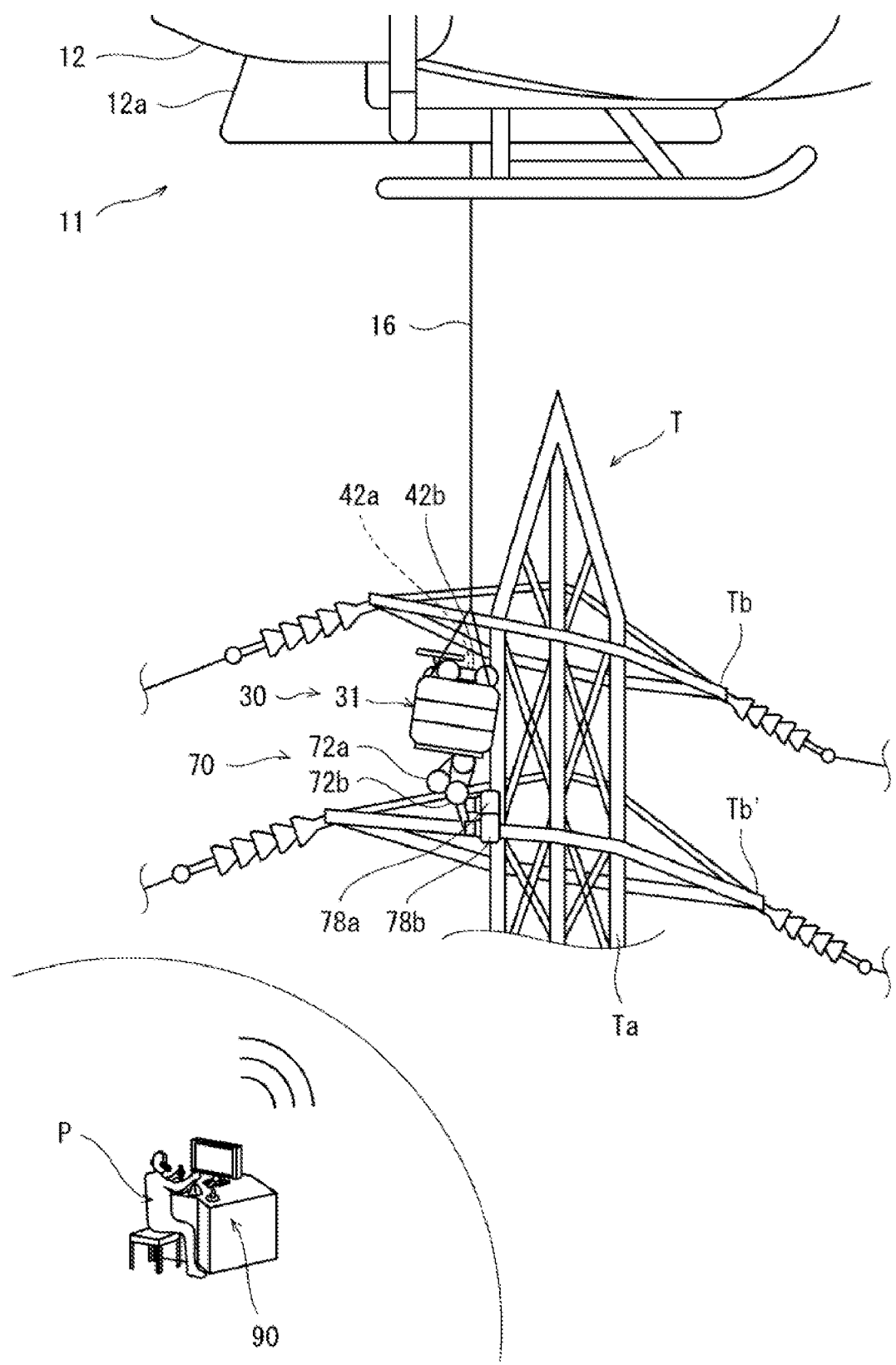
FIG. 7 is a schematic view illustrating a situation in which, when the work system according to one embodiment of the present disclosure fixes the robot to the structure, the robot extends second robotic arms and grasps a part of a steel tower by second robot hands.

FIG. 7 is a schematic view illustrating a situation in which, when the work system according to this embodiment fixes the robot to the structure, it extends the second robotic arms and grasps a part of the steel tower by the second robot hands. Further, as illustrated in FIG. 7, it extends the pair of robotic arms 72a and 72b of the fixing device 70, and grasps a part of a main post Ta of the steel tower T (a part of the structure) by the pair of robot hands 78a and 78b of the fixing device 70. Note that, for example, additionally or alternatively to the pair of robotic arms 72a and 72b and the pair of robot hands 78a and 78b, the fixing device 70 may be provided in a side surface of the base 32 with magnet(s) which can stick to the steel tower T.

Figure 8:
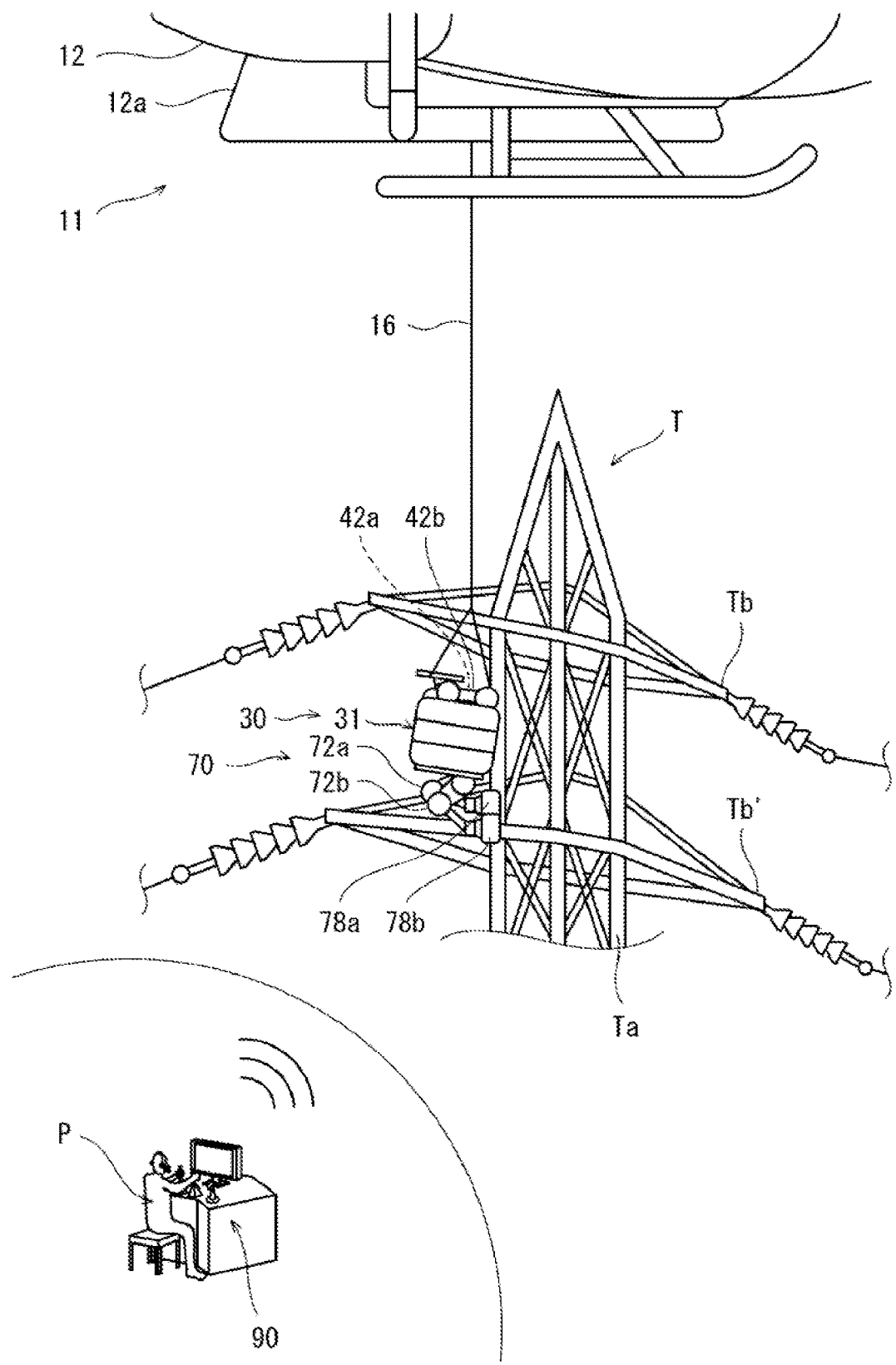
FIG. 8 is a schematic view illustrating a situation in which, when the work system according to one embodiment of the present disclosure fixes the robot to the structure, after it grasps the part of the steel tower by second robot hands of a fixing device, it contracts the second robotic arms.

FIG. 8 is a schematic view illustrating a situation in which, when the work system according to this embodiment fixes the robot to the structure, it contracts the second robotic arms after it grasps a part of the steel tower by the second robot hands of the fixing device. Then, as illustrated in FIG. 8, after the pair of robot hands 78a and 78b of the fixing device 70 grasp the main post Ta, the pair of robotic arms 72a and 72b are contracted so that the robot body 31 is brought closer to a part of the main post Ta which is grasped by the pair of robotic hands 78a and 78b. As described above, one robot 30 can be fixed to the steel tower T by the fixing device 70.

Figure 9:
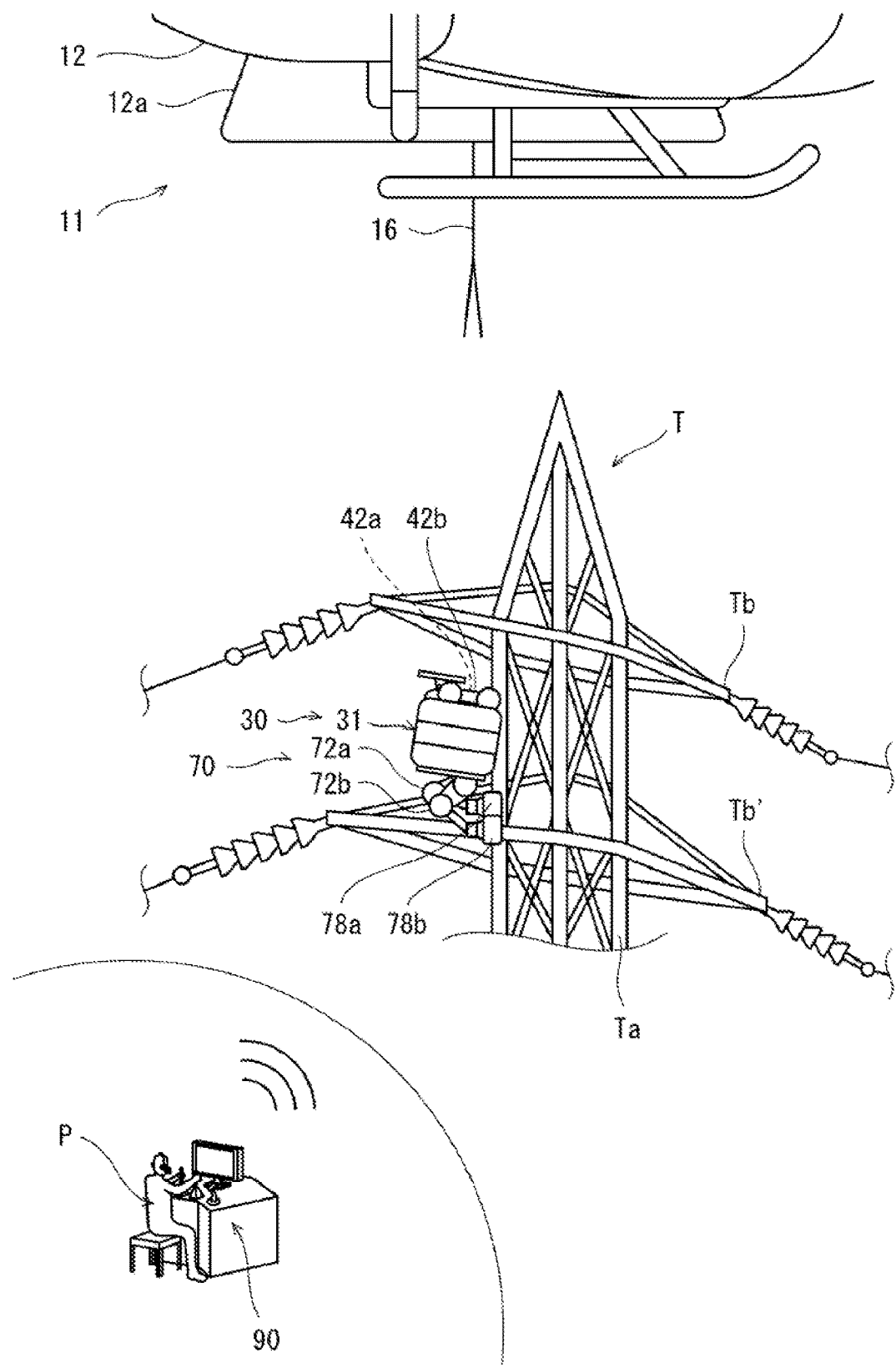
FIG. 9 is a schematic view illustrating a situation in which the work system according to one embodiment of the present disclosure releases the robot from the aircraft.

FIG. 9 is a schematic view illustrating a situation in which the work system according to this embodiment releases the robot from the aircraft. As illustrated in FIG. 9, once it is confirmed that one robot 30 is fixed to the steel tower T by the fixing device 70, the wire rope 16 is removed from the robot 30 to release the robot 30 from the VTOL aircraft 11, and then the wire rope 16 is wound up by the winch 15.

Note that, similarly to the above, the other robot 30 is fixed to the steel tower T by the fixing device 70, and the other robot 30 is then released from the VTOL aircraft 11. Note that, after the VTOL aircraft 11 released the robots 30 over the steel tower T, it may close the door 12a and leave from above the steel tower T.

The operator P may remotely perform using the interface 90 that the robots 30 are fixed to the steel tower T, and the robots 30 are released from the VTOL aircraft 11, as described above. Further, the VTOL aircraft may autonomously perform that the VTOL aircraft 11 closes the door 12a and leaves from above the steel tower T, as described above.

Figure 10:
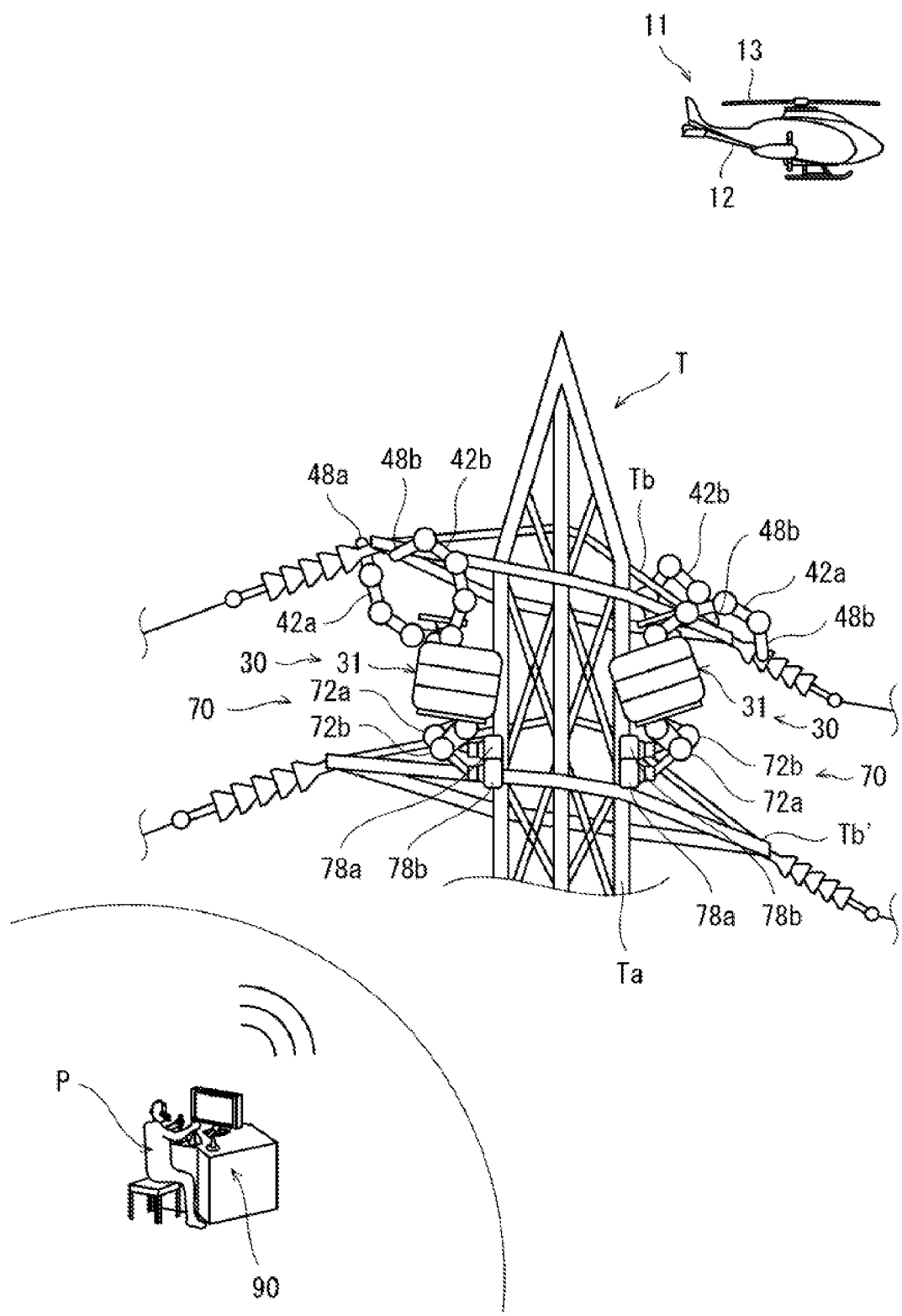
FIG. 10 is a schematic view illustrating a situation in which the work system according to one embodiment of the present disclosure performs a work to the structure by using the robots.

FIG. 10 is a schematic view illustrating a situation in which the work system according to this embodiment performs a work to the structure by using the robots. As illustrated in FIG. 10, the robots 30 are each fixed to the steel tower T by the fixing device 70, and each performs a work to the steel tower T by the pair of robot hands 48a and 48b while changing the posture of the pair of robotic arms 160a and 160b.

The work to the steel tower T may be, for example, that a part of the pair of robot hands 48a and 48b is configured as a screw driver, and a bolt or a nut is fastened to the steel tower T by the screw driver. However, without being limited to this case, other works may be performed to the steel tower T by the pair of robot hands 48a and 48b.

The operator P may remotely perform the work to the steel tower T by the robots 30 as described above by using the interface 90. Note that the operator P may remotely operate the robots 30, while switching the robot 30 to be a target of the remote control among the robots 30. In such a case, the operator P may remotely operate the robots 30, for example, while switching an image displayed on a display of the interface 90 to an image captured by the camera 56 of the robot 30 which is the target of remote control among the robots 30.

Note that a camera for acquiring an image by imaging a situation in which the robots 30 perform the work to the steel tower T may be provided to the VTOL aircraft 11, and the operator P may perform the remote control using the interface 90 based on the image. Note that, for example, the image may be the entire image of the robots 30 and their circumference, or a local image of a part where one of the robots 30 performs the work to the steel tower T, and its circumference.

Alternatively, a drone for image pick-up may be stored beforehand inside the VTOL aircraft 11, the VTOL aircraft 11 may release the drone for image pick-up over the steel tower T, and the operator P may perform the remote control using the interface 90 based on the image captured by the drone for image pick-up.

Figure 11:
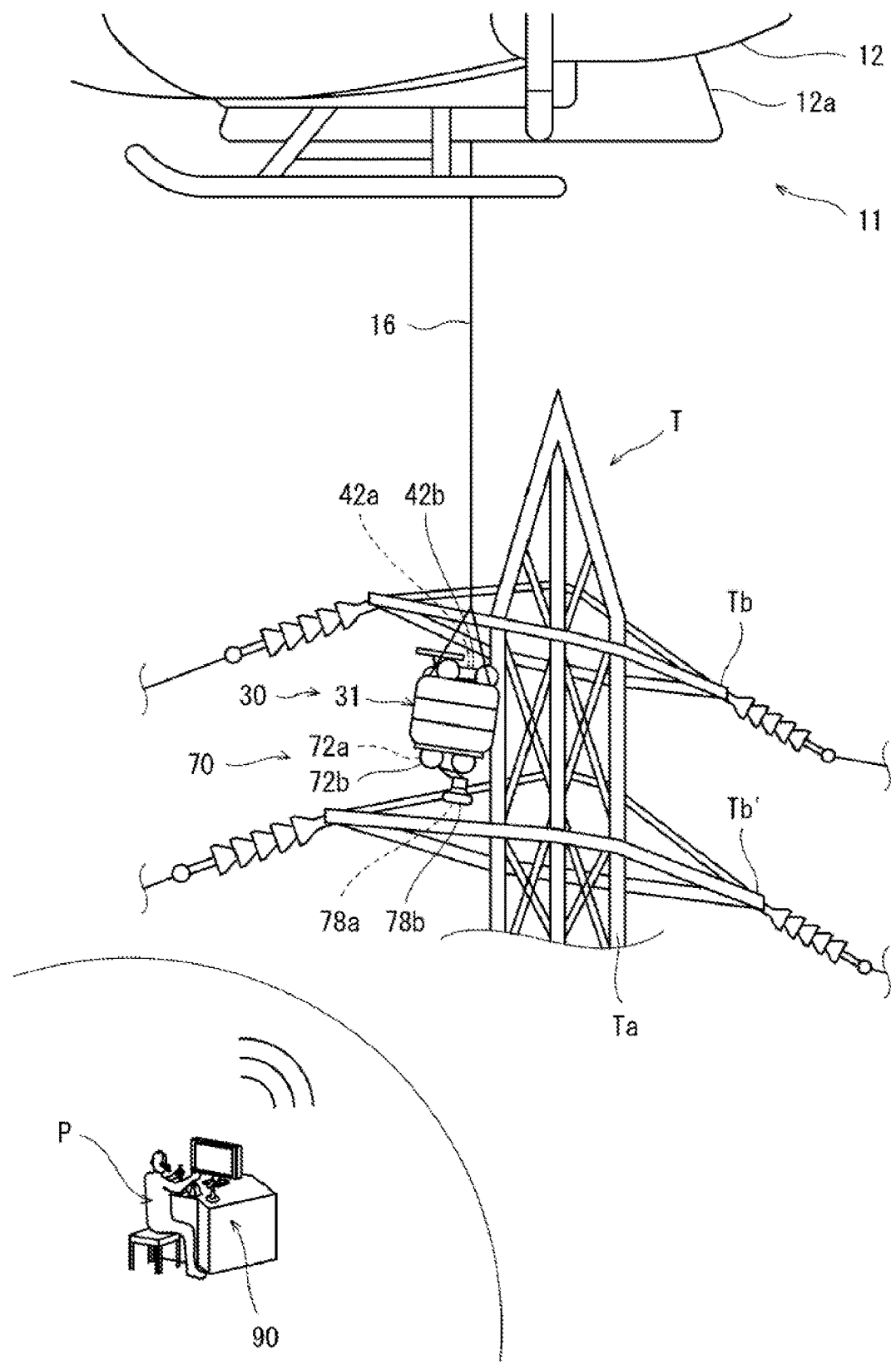
FIG. 11 is a schematic view illustrating a situation in which the work system according to one embodiment of the present disclosure recovers the robots by the aircraft.

FIG. 11 is a schematic view illustrating a situation in which the work system according to this embodiment recovers the robots by the aircraft. Finally, as illustrated in FIG. 11, the VTOL aircraft 11 recovers the robots 30 on the steel tower T. Note that, FIG. 11 illustrates a state where the VTOL aircraft 11 recovers one of the robots 30 on the steel tower T, after it recovered the other robot 30.

In detail, for example, the VTOL aircraft 11 flies over the steel tower T before and after the work to the steel tower T by the robots 30 is finished. Next, while the VTOL aircraft 11 hovers over the steel tower T, the door 12*a* of the VTOL aircraft body 12 is opened. Then, the wire rope 16 is unwound downwardly from the VTOL aircraft body 12. Next, after the other robot 30 is attached to the tip end of the wire rope 16, the fixing device 70 of the other robot 30 cancels the fixing to the steel tower T (in detail, the pair of robot hands 78*a* and 78*b* each release the part of the main post Ta), and the wire rope 16 is wound up by the winch 15, thereby storing the other robot 30 inside the VTOL aircraft 11.

Note that the attachment of the robot 30 to the tip end of the wire rope 16 may be performed by the pair of robot hands 48*a* and 48*b* of the robot 30 grasping the tip end of the wire rope 16, and the pair of robot hands 48*a* and 48*b* attaching the tip end of the wire rope 16 to a hook provided to the base 32.

As described above, the VTOL aircraft 11 recovers the other robot 30 on the steel tower T. Further, similarly to the above, the VTOL aircraft 11 recovers one robot 30 on the steel tower T.

The operator P may remotely perform using the interface 90 that the VTOL aircraft 11 recovers the robots 30 on the steel tower T as described above. Note that, when the tip end of the wire rope 16 is attached to the hook of the base 32 by the pair of robot hands 48*a* and 48*b*, the operator P may also remotely perform this work by using the interface 90.

(Effects)

Since the work system 10 according to this embodiment conveys the robots 30 over the steel tower T by the VTOL aircraft 11, lowers the robots 30 on the steel tower T from the VTOL aircraft 11, releases the robots 30 from the VTOL aircraft 11, and then performs the work to the steel tower T by the robots 30, it becomes possible to perform the work to the steel tower T.

Further, in this embodiment, since each robot 30 has the fixing device 70, the robots 30 can perform the work to this steel tower T stably on the steel tower T.

Further, in this embodiment, the operator P remotely performs using the interface 90 that the VTOL aircraft 11 lowers the robots 30 onto the steel tower T, and the robots 30 perform the work to the steel tower T. Therefore, as compared with the case of autonomously performing that the VTOL aircraft 11 lowers the robots 30 onto the steel tower T and the robots 30 perform the work to the steel tower T, it becomes possible to securely perform these processes.

(One Example of Work Method)

Figure 12:
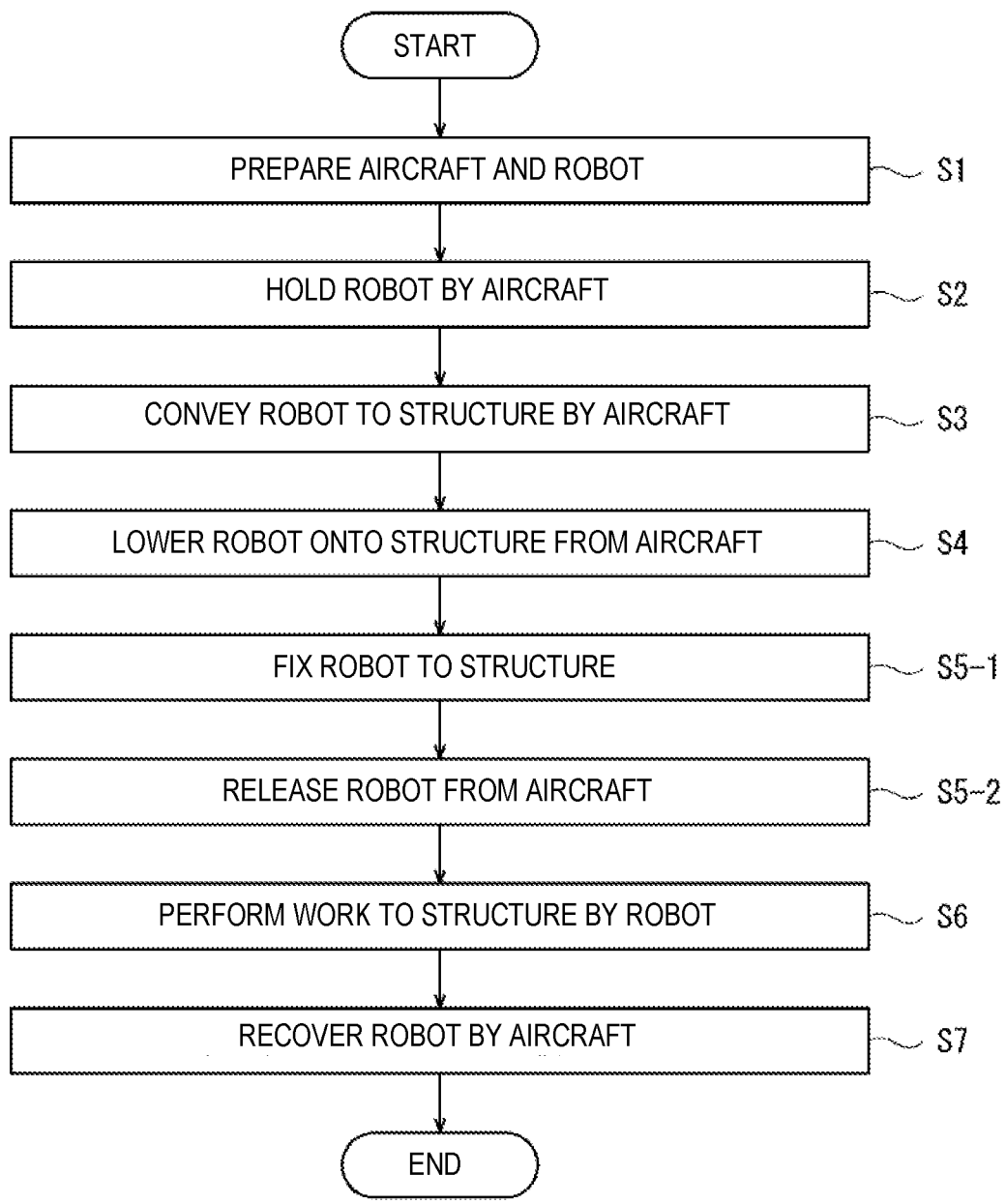
FIG. 12 is a flowchart illustrating a work method according to one embodiment of the present disclosure.

One example of the work method according to one embodiment of the present disclosure is described based on FIG. 12. FIG. 12 is a flowchart illustrating the work method according to this embodiment.

As illustrated in FIG. 12, first, Step S1 (first step) at which the aircraft and the robot are prepared is performed. Note that, although in the above embodiment the VTOL aircraft 11 is prepared as the aircraft, the two robots 30 are prepared as the robot, and the interface 90 is prepared, Step S1 may be performed in other forms, without being limited to the case described above.

Next, Step S2 (second step) at which the robot is attached to or is stored inside the aircraft is performed. Note that, although in the above embodiment the robots 30 are stored inside the VTOL aircraft 11, Step S2 may be performed in other forms, without being limited to the case described above.

Further, Step S3 (third step) at which the robot is conveyed over the structure by the aircraft is performed. Note that, although in the above embodiment the robots 30 are conveyed over the steel tower T by the VTOL aircraft 11, Step S3 may be performed in other forms, without being limited to the case described above.

Then, Step S4 (fourth step) at which the robot is lowered onto the structure from the aircraft is performed. Note that, although in the above embodiment the robots 30 are lowered onto the steel tower T from the VTOL aircraft 11 by using the winch 15 and the wire rope 16, Step S4 may be performed in other forms, without being limited to the case described above.

Next, Step S5-1 at which the robot is fixed to the structure is performed. Note that, although in the above embodiment each robot 30 is fixed to the steel tower T by the pair of robot hands 78*a* and 78*b* of the fixing device 70 grasping the main post Ta of the steel tower T, Step S5-1 may be performed in other forms, without being limited to the case described above.

Further, Step S5-2 (fifth step) at which the robot is released from the aircraft is performed. Note that, although in the above embodiment the robots 30 are fixed to the steel tower T by the pair of robot hands 78*a* and 78*b* of the fixing device 70 releasing the main post Ta of the steel tower T, Step S5-2 may be performed in other forms, without being limited to the case described above.

Then, Step S6 (sixth step) at which a work to the structure is performed by the robot is performed. Note that, although in the above embodiment the robots 30 perform the work to the steel tower T by the pair of robot hands 48*a* and 48*b*, while changing the posture of the pair of robotic arms 160*a* and 160*b*, Step S6 may be performed in other forms, without being limited to the case described above.

Finally, Step S7 at which the robot is recovered by the aircraft is performed. Note that, although in the above embodiment the VTOL aircraft 11 recovers the robots 30 by storing the robots 30 inside the VTOL aircraft 11 using the winch 15 and the wire rope 16, Step S7 may be performed in other forms, without being limited to the case described above.

OTHER EMBODIMENTS

Figure 13:
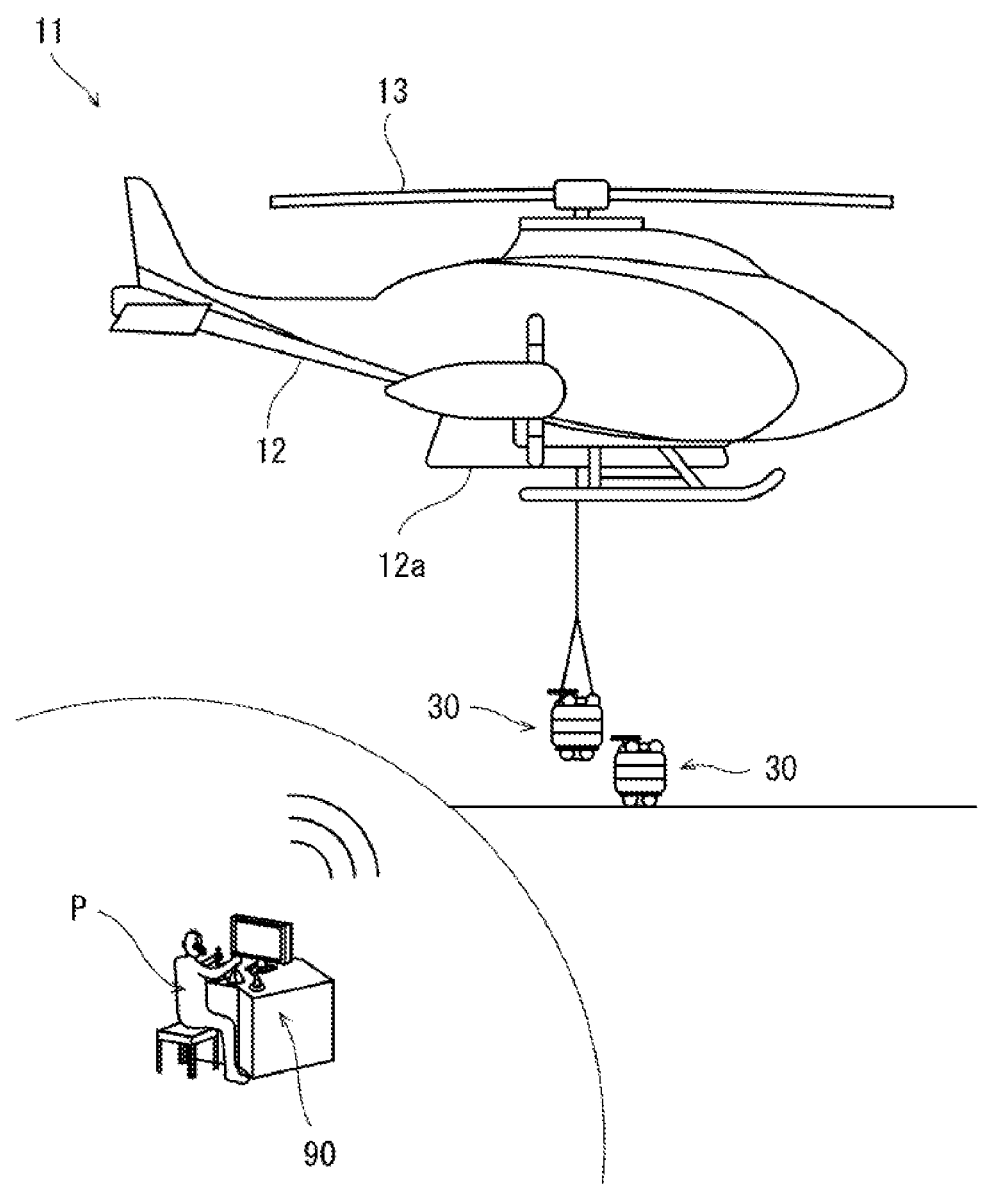
FIG. 13 is a schematic view illustrating a situation in which the work system according to another embodiment of the present disclosure stores the robot inside the aircraft.

A work system according to another embodiment of the present disclosure is described based on FIG. 13. FIG. 13 is a schematic view illustrating a situation in which the work system according to this embodiment stores the robot inside the aircraft. Note that the work system according to this embodiment is similar to the work system 10 according to the above embodiment, except for the mode in which the robots 30 are stored inside the VTOL aircraft 11. Therefore, the same reference characters are assigned to the same parts not to repeat similar descriptions.

In this embodiment, as illustrated in FIG. 13, while the VTOL aircraft 11 hovers over one robot 30, the door 12a provided to the bottom part of the VTOL aircraft body 12 is opened, and the wire rope 16 wound up by the winch 15 is unwound downwardly from the VTOL aircraft body 12. Then, as illustrated in this drawing, after one robot 30 is attached to the tip end of the wire rope 16, this robot 30 is stored inside the VTOL aircraft 11 by the wire rope 16 being wound up by the winch 15. Further, similarly to the above, the other robot 30 is stored inside the VTOL aircraft 11.

When the robot 30 is stored inside the VTOL aircraft 11 as described above, for example, the VTOL aircraft 11 may autonomously perform that the VTOL aircraft 11 hovers over the robot 30, and the operator P may remotely perform using the interface 90 that the winch 15 unwinds and winds up the wire rope 16 and the robots 30 are attached to the tip end of the wire rope 16.

Note that, as illustrated in FIG. 13, the VTOL aircraft 11 may convey the robot 30 over the steel tower T, while suspending the robot 30 from the wire rope 16. Alternatively, the VTOL aircraft 11 may suspend a storage device from the wire rope 16, store the robot 30 inside the storage device while the storage device is placed on the ground, and release the robot 30 from the storage device over the steel tower T.

(Modifications)

It is apparent for the person skilled in the art that many improvement and other embodiments of the present disclosure are possible from the above description. Therefore, the above description is to be interpreted only as illustration, and it is provided in order to teach the person skilled in the art the best mode to implement the present disclosure. The details of the structures and/or the functions may be changed substantially, without departing from the spirit of the present disclosure.

Figure 15:
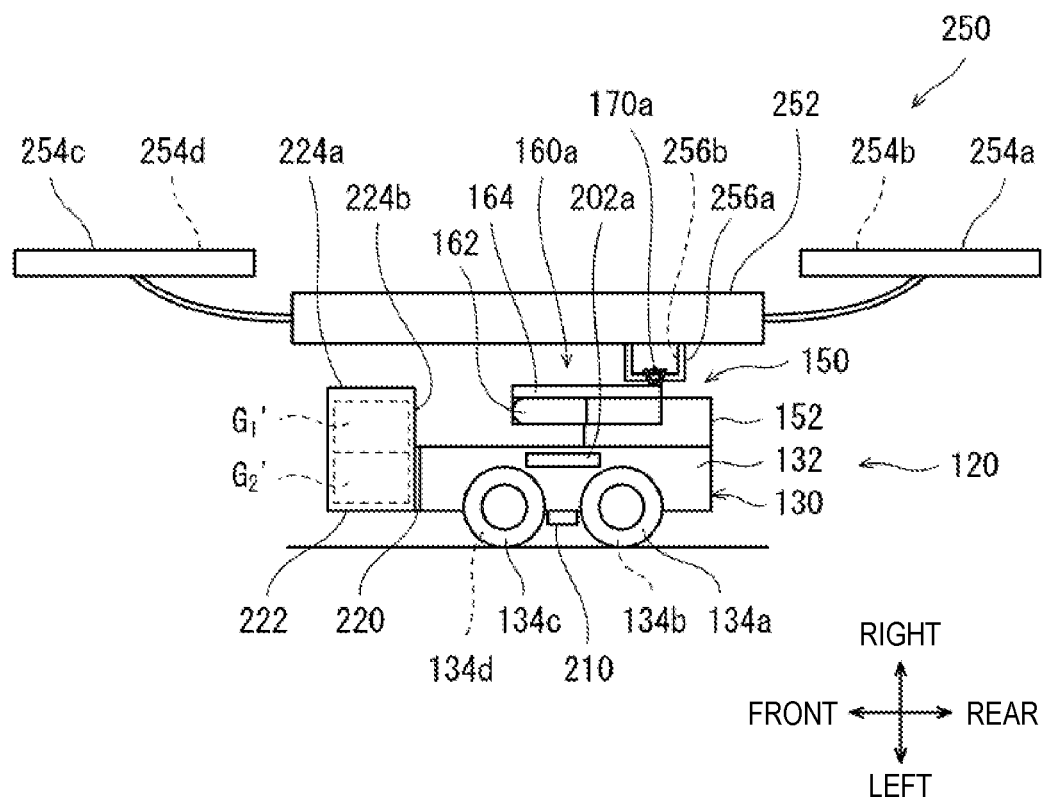
FIG. 15 is a schematic view illustrating a robot and an aircraft provided to the work system according to one embodiment of the present disclosure, and is a side view illustrating a situation in which the self-propelled robot having a similar structure in part to the robot described above is attached to another aircraft.

In the above embodiment, the work system 10 is provided with the VTOL aircraft 11 as the aircraft. However, without being limited to this case, the work system 10 may be provided with, for example, a drone 250 as illustrated in FIG. 15, a manned aircraft which is operated by a person, or other aircrafts. Note that since other aircrafts have known structures, the detailed description thereof is omitted herein.

In the above embodiment, the VTOL aircraft 11 as the aircraft holds the robot 30 by storing the robot 30 inside the VTOL aircraft 11. However, without being limited to this case, the drone 250 as illustrated in FIG. 15 may be prepared as the aircraft, and the robot 30 may be held by the aircraft by attaching the robot 30 to a lower part of the drone 250 as illustrated in this drawing.

In the above embodiment, the VTOL aircraft 11 as the aircraft conveys the robot 30 over the steel tower T, and the robot 30 performs the work to the steel tower T. However, without being limited to this case, for example, the aircraft may convey the robot 30 to a structure other than the steel tower T, such as a skyscraper, and the robot 30 may perform the work to this structure. Note that the aircraft may convey the robot 30 to a location near a side part of the structure, instead of above the structure.

(Self-Propelled Robot 120)

Finally, the detailed structure of the self-propelled robot 120 which has a similar structure in part to the robot 30 (see FIG. 2) according to the above embodiment is described. FIGS. 14A and 14B are schematic views illustrating the robot provided to the work system according to the above embodiment, where FIG. 14A is a side view of the self-propelled robot which has a similar structure in part to the robot described above, and FIG. 14B is a top view of the self-propelled robot which has a similar structure in part to the robot described above.

For example, the pair of robotic arms 42a and 42b and the pair of robotic arms 72a and 72b which are described in the above embodiment may have similar structures to a pair of robotic arms 160a and 160b illustrated in FIGS. 14A and 14B. Further, the pair of robot hands 48a and 48b and the pair of robot hands 78a and 78b which are described in the above embodiment may have similar structures to a pair of robot hands 170a and 170b illustrated in FIGS. 14A and 14B.

As illustrated in FIGS. 14A and 14B, a travel cart 130 includes a rectangular parallelepiped cart body 132 and four wheels 134a-134d attached to a bottom part of the cart body 132. The wheels 134a and 134b are attached to a rear part of the cart body 132 via one of axles, and they are rotated by a control device so that the travel cart 130 travels by itself in the moving direction. Further, the wheels 134c and 134d are attached to a front part of the cart body 132 via the other axle, and they are controlled by the control device so that the travel cart 130 changes the moving direction.

A storing container 222 is provided to a front surface of the cart body 132 via a mounting part 220. In other words, the storing container 222 is provided in front of the travel cart 130. The storing container 222 has a rectangular parallelepiped shape which is hollow and elongated in the height direction, where articles $G_1'$ and $G_2'$ can be loaded and stored. An opening 224a is formed entirely in an upper surface of the storing container 222. A rectangular opening 224b is formed in a rear surface of the storing container 222, which extends entirely in the width direction and extends from an upper edge of the storing container 222 to near a center part in the height direction. The openings 224a and 224b are formed so as to be connected at a corner of the storing container 222, where the upper surface and the rear surface of the storing container 222 are connected and which extends in the left-and-right direction.

(Robot Body 150)

As illustrated in FIGS. 14A and 14B, the robot body 150 includes a base part 152 which is provided to the upper part of the travel cart 130 and is swivelable on a rotation axis $AX_1'$ extending vertically, and the pair of robotic arms 160a and 160b coupled at their base-end parts to the base part 152. Further, the robot body 150 also includes the robot hands 170a and 170b which are provided to tip ends of the pair of robotic arms 160a and 160b, respectively.

(Base Part 152)

The base part 152 is provided to a rear part of the upper surface of the cart body 132. The base part 152 has a cylindrical shape, and is provided so that its bottom surface contacts or substantially contacts the rear part of the upper surface of the cart body 132. A rear end of the base part 152 is located at the same position as the rear surface of the cart body 132 in the front-and-rear direction. Note that the rear end of the base part 152 may be located forward of the rear surface of the cart body 132. The center line of the base part 152 is located on the center line of the cart body 132 which extends in the front-and-rear direction at the center of the cart body 132 in the left-and-right direction. The base part 152 is swivelable on the rotation axis $AX_1'$ which extends vertically. In other words, the robot body 150 has a joint part $JT_1'$ which couples the cart body 132 to the base part 152 swivelably on the rotation axis $AX_1'$.

(Pair of Robotic Arms 160a and 160b)

The pair of robotic arms 160a and 160b each includes a link 162 and a link 164 which is coupled at its base-end part to a tip-end part of the link 162 via a joint part $JT_3'$. In a retracted state illustrated in FIGS. 14A and 14B, the pair of robotic arms 160a and 160b extend along the center line of the self-propelled robot 120 which extends in the front-and-rear direction at the center of the self-propelled robot 120 in the left-and-right direction, and are plane symmetry to each other with respect to a plane parallel to both side surfaces of the cart body 132. The pair of robotic arms 160a and 160b are operable independently, or operable collaboratively with each other.

Base-end parts of the pair of links 162 are coupled to the base part 152 so that they are coaxially pivotable on a rotation axis $AX_2'$ extending horizontally, and so that they oppose to each other via the base part 152. In other words, the pair of robotic arms 160a and 160b each have a Joint part $JT_2'$ which couples the base part 152 to the link 162 so as to be rotatable on the rotation axis $AX_2'$.

The pair of links 162 are extendable and contractible in the longitudinal direction by each having a base-end part 163 and a tip-end-part 163' which is extendable and contractible in a direction of projecting from a tip end of the base-end part 163. Thus, for example, by contracting the pair of robotic arms 160a and 160b, the pair of robot hands 170a and 170b become easier to be inserted into the storing container 122.

Base-end parts of the pair of links 164 are each coupled to a side part of the tip-end part of the corresponding link 162, which is on the side opposing to the other link 162 via a cube-shaped coupling part. The tip-end parts of the pair of links 162 and the base-end parts of the pair of links 164 are each formed in a semicircular shape as seen in the corresponding thickness direction.

The joint part $JT_3'$ (i.e., the joint part $JT_3'$ which intervenes between the link 162 and the link 164) including the coupling part can rotate the link 164 with respect to the link 162 on the rotation axis $AX_3'$ extending horizontally, and on a rotation axis $AX_4'$ perpendicular to the rotation axis $AX_3'$.

In other words, by the coupling part rotating on the rotation axis $AX_3'$ with respect to the tip-end part of the link 162, the link 162 is rotatable on the rotation axis $AX_3'$ integrally with the coupling part. Moreover, by the link 164 rotating on the rotation axis $AX_4'$ with respect to the coupling part, the link 164 is rotatable on the rotation axis $AX_4'$.

FIG. 15 is a schematic view illustrating a robot and an aircraft provided to the work system according to this embodiment, and is a side view illustrating a situation in which the self-propelled robot having a similar structure in part to the robot described above is attached to another aircraft.

For example, when the pair of robotic arms 42a and 42b and the pair of robot hands 48a and 48b which are described in the above embodiment has similar structures to the pair of robotic arms 160a and 160b and the pair of robot hands 170a and 170b which are illustrated in FIGS. 14A and 14B, the robot 30 which is described in the above embodiment may be held by the drone 250 by being attached underneath the drone 250 as the aircraft in a mode illustrated in FIG. 15.

As illustrated in FIG. 15, the drone 250 includes a drone body 252 and four propellers 154a-154d attached to the drone body 252. For example, the drone 250 is capable of generating electricity by using rotation of the propellers 154a-154d.

As illustrated in FIG. 15, the drone 250 further includes a pair of handles 156a and 156b. The pair of handles 156a and 156b are provided to a bottom part of the drone body 252 so as to correspond to the pair of robot hands 170a and 170b of the self-propelled robot 120 which becomes in the retracted state. After becoming in the retracted state, the self-propelled robot 120 is attached underneath the drone 250 by the robot hand 70a grasping the handle 156a and the robot hand 70b grasping the handle 156b.

In FIG. 15, the self-propelled robot 20 is in a state where the articles $G_1'$ and $G_2'$ are stored in the storing container 122. At this time, the self-propelled robot 120 becoming in the retracted state by piling the pair of links 162 and the pair of links 164 in the height direction in the side view so that the entire center of gravity of the self-propelled robot 120 and the articles $G_1'$ and $G_2'$ can be located at a center part of the self-propelled robot 120.

OTHER EMBODIMENTS

Figure 18:
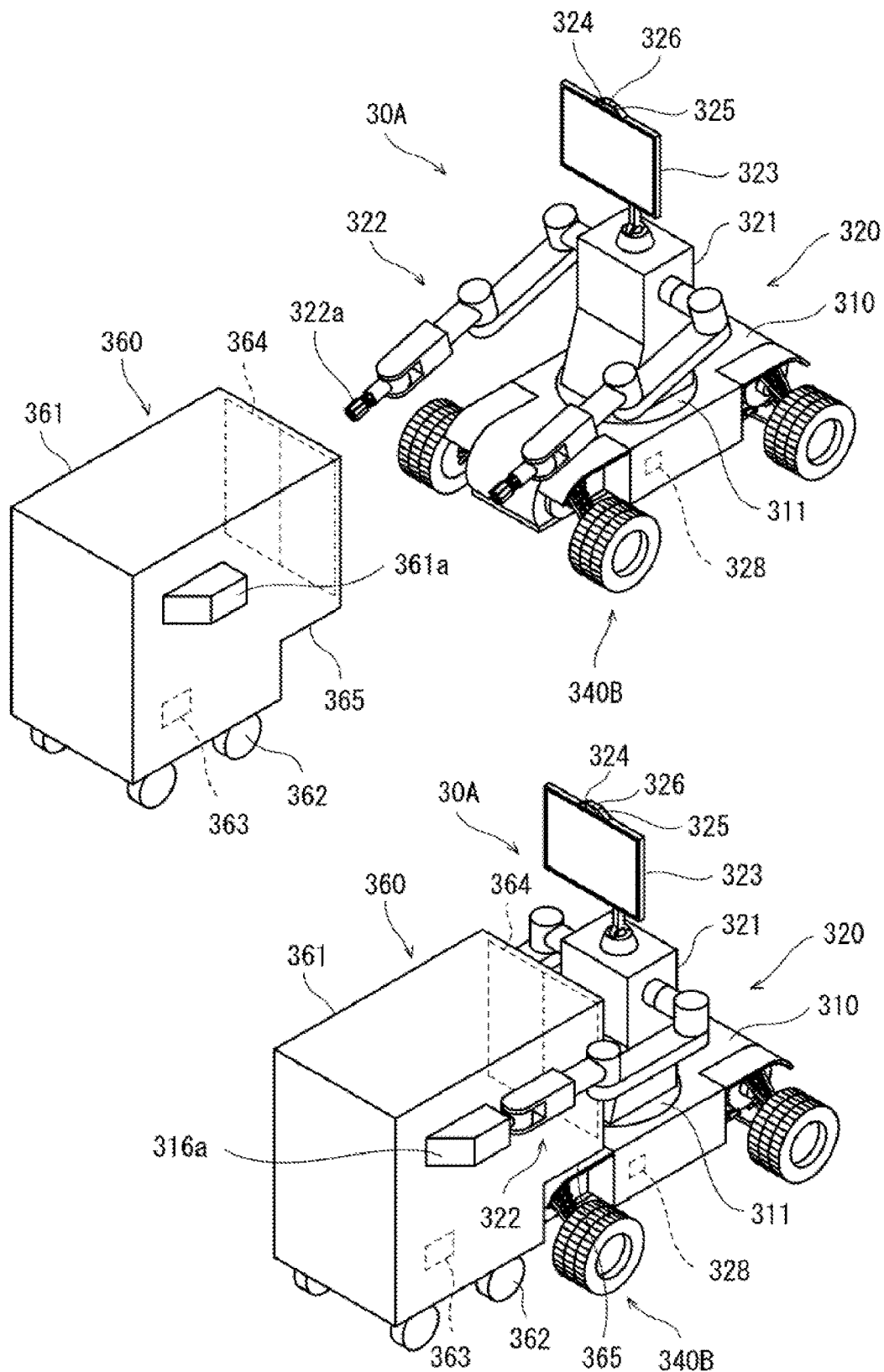
FIG. 18 is a perspective view illustrating a second configuration and use mode of a self-propelled robot in which the mobile robot of FIG. 16 is configured as a delivery robot.
Figure 19:
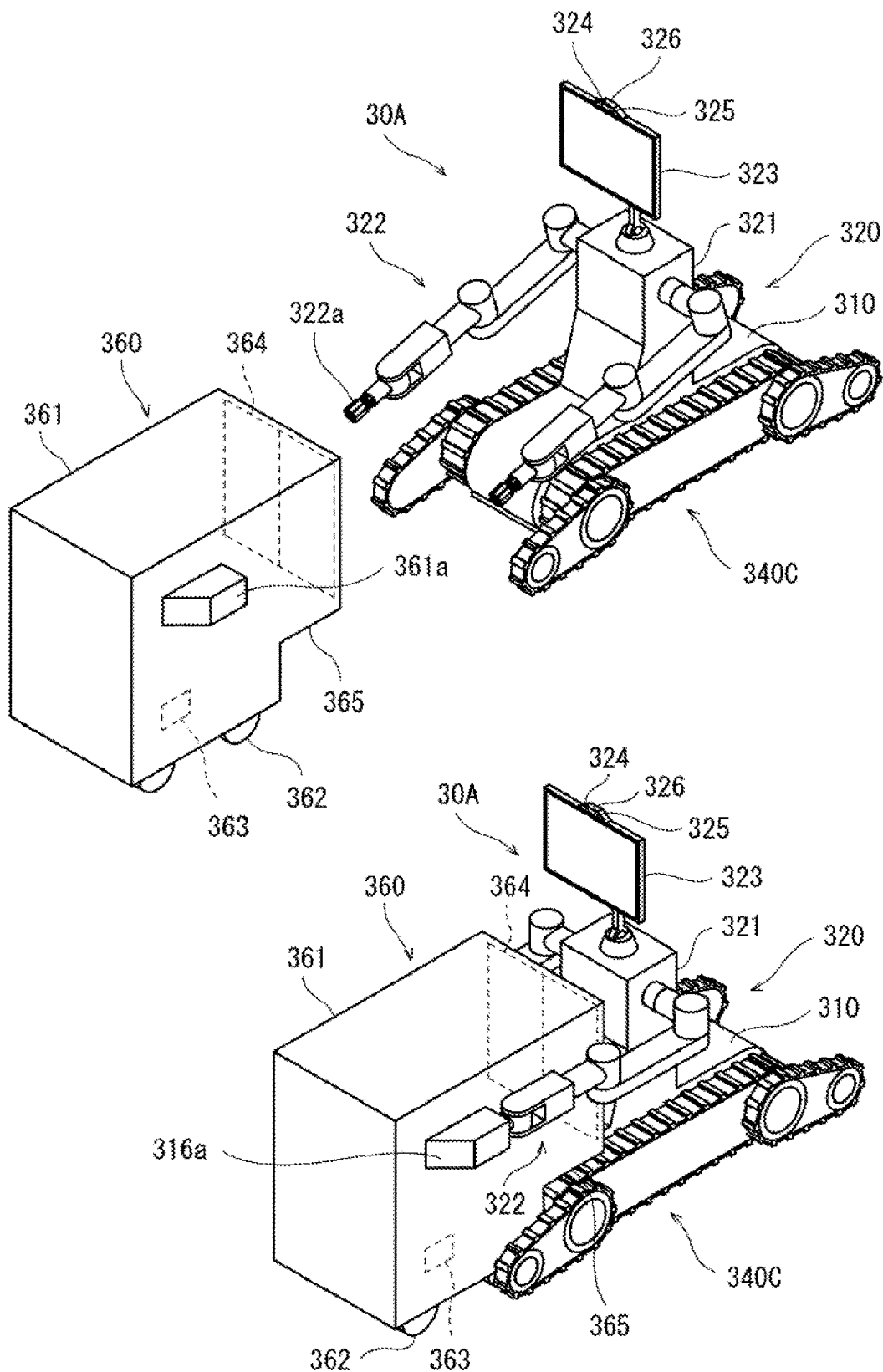
FIG. 19 is a perspective view illustrating a third configuration and use mode of a self-propelled robot in which the mobile robot of FIG. 16 is configured as a delivery robot.
Figure 20:
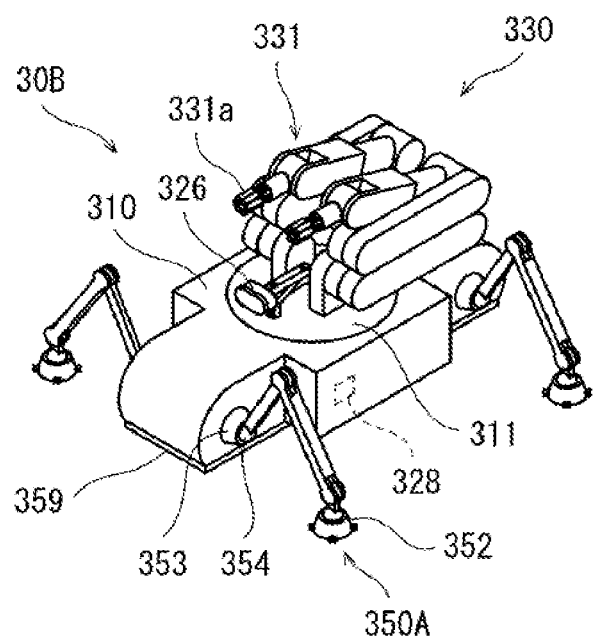
FIG. 20 is a perspective view illustrating a first configuration and use mode of a high-place walking robot in which the mobile robot of FIG. 16 is configured as a maintenance robot.
Figure 20:
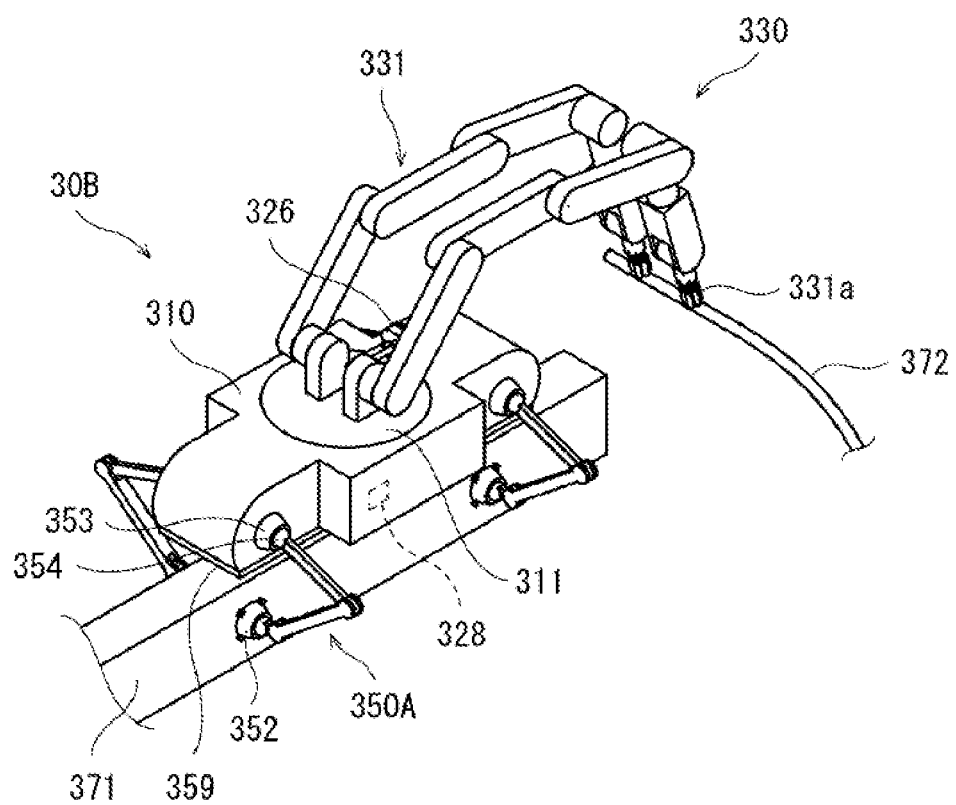

A work system according to another embodiment is described based on FIGS. 16 to 21, and 22A and 22B. Note that a high-place walking robot 30B illustrated in FIG. 20 is a first modification of the robot 30 described based on FIGS. 1 to 13, and a high-place walking robot 30B illustrated in FIG. 20 is a second modification of the robot 30.

Figure 16:
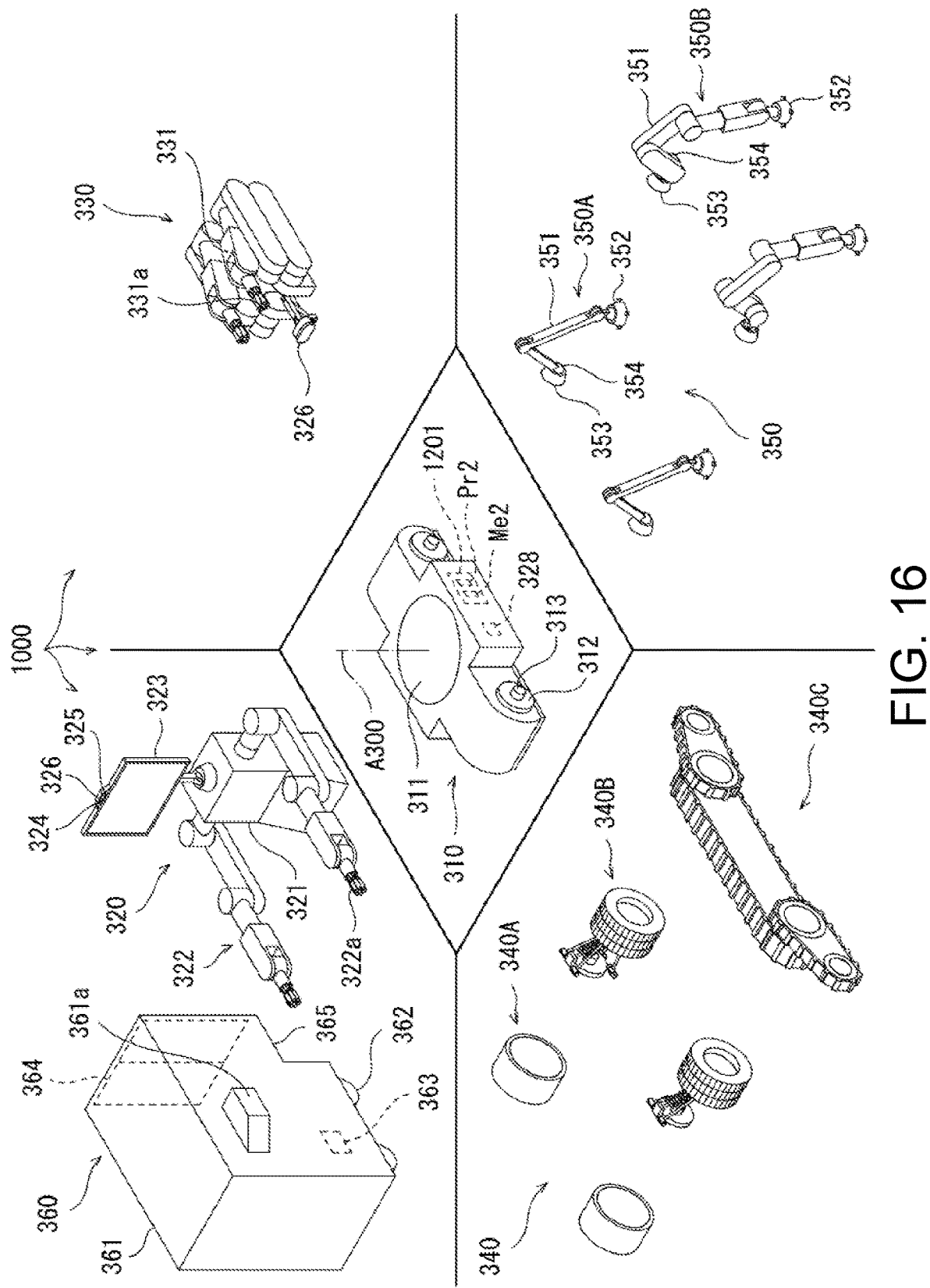
FIG. 16 is an exploded view illustrating one example of a configuration of a mobile robot used for a work system according to another embodiment of the present disclosure.
Figure 17:
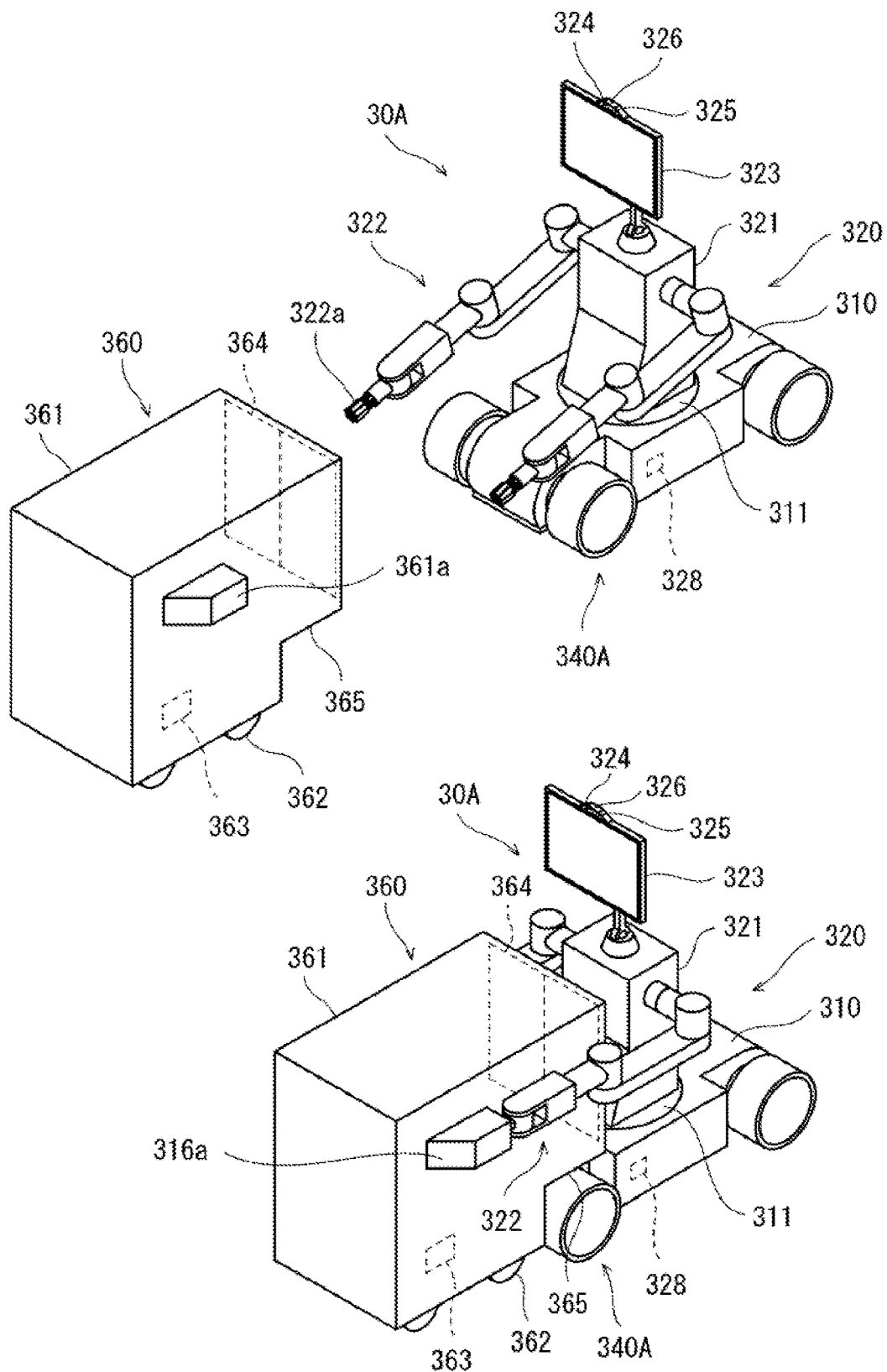
FIG. 17 is a perspective view illustrating a first configuration and use mode of a self-propelled robot in which the mobile robot of FIG. 16 is configured as a delivery robot.
Figure 21:
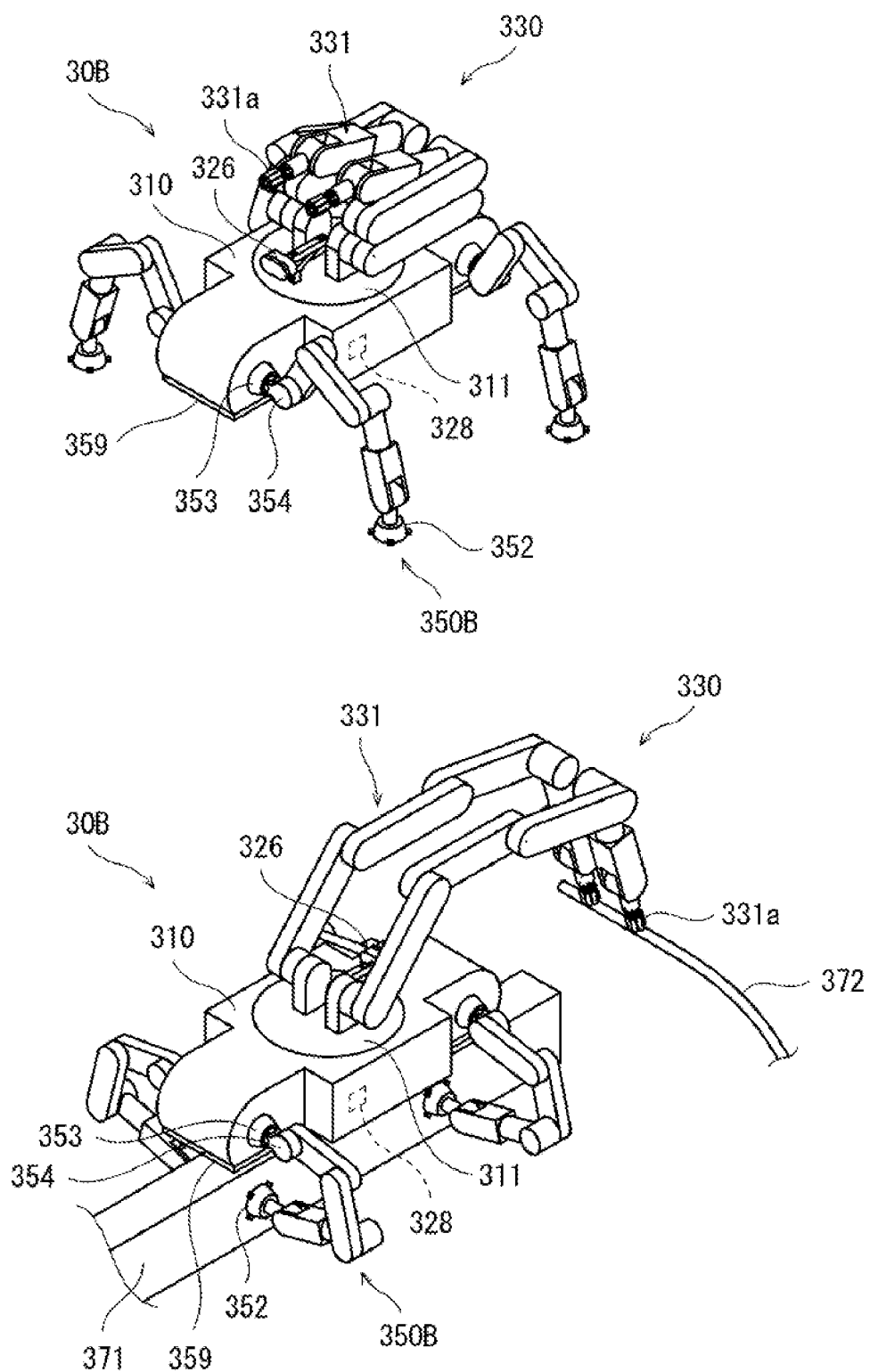
FIG. 21 is a perspective view illustrating a second configuration and use mode of a high-place walking robot in which the mobile robot of FIG. 16 is configured as a maintenance robot.

FIG. 16 is an exploded view illustrating one example of a configuration of a mobile robot 1000 used for an unmanned delivery system according to another embodiment of the present disclosure. FIG. 17 is a perspective view illustrating a first configuration and use mode of the self-propelled robot 30A in which the mobile robot 1000 of FIG. 16 is configured as a delivery robot. FIG. 18 is a perspective view illustrating a second configuration and use mode of the self-propelled robot 30A in which the mobile robot 1000 of FIG. 16 is configured as a delivery robot. FIG. 19 is a perspective view illustrating a third configuration and use mode of the self-propelled robot 30A in which the mobile robot 1000 of FIG. 16 is configured as a delivery robot. FIG. 20 is a perspective view illustrating a first configuration and use mode of the high-place walking robot 30B in which the mobile robot 1000 of FIG. 16 is configured as a maintenance robot. FIG. 21 is a perspective view illustrating a second configuration and use mode of the high-place walking robot 30B in which the mobile robot 1000 of FIG. 16 is configured as a maintenance robot.

Referring to FIG. 16, the mobile robot 1000 may be selectively configured as the self-propelled robot 30A which is a delivery robot specialized in delivery, or the high-place walking robot 30B which is a maintenance robot specialized in maintenance of a high-rise structure. Below, this is described in detail.

The mobile robot 1000 includes a base unit 310 (corresponding to the base 32 described based on FIGS. 1 to 13), a robotic-arm part 320 or 330, and a mobile parts 340 or 350. In FIG. 10, the base unit 310 is illustrated at the center, the robotic-arm part 320 (third robotic arm) and a wagon 360 are illustrated at the upper left, the mobile part 340 is illustrated at the lower left, the robotic-arm part 330 is illustrated at the upper right, and the mobile part 350 (second robotic arm) is illustrated at the lower right.

By attaching the robotic-arm part 320 to an upper surface of the base unit 310, and attaching the mobile part 340 to side surfaces at both ends of the base unit 310, the self-propelled robot 30A which is the delivery robot is configured (see FIGS. 17 to 19). By attaching the robotic-arm part 330 to the upper surface of the base unit 310, and attaching the mobile part 350 to the side surfaces on both ends of the base unit 310, the high-place walking robot 30B which is a maintenance robot is configured (see FIGS. 20 to 21 and FIGS. 22A to 22D).

(Base Unit 310)

The base unit 310 is a part which constitutes the body and chassis of the mobile robot 1000, and is formed in a shape having a substantially constant thickness and having thin-width parts at both ends in the longitudinal direction. The base unit 310 is provided at the upper surface of the center part of the base unit 310 with a robotic-arm part mounting part 311 where the robotic-arm part 320 or 330 is attached. For example, the robotic-arm part mounting part 311 is formed in a short pillar shape, and is provided to the main body of the base unit 310 so as to be rotatable by a motor (not illustrated) on a rotation axis A300 perpendicular to the upper surface of the center part of the base unit 310. The robotic-arm part mounting part 311 is provided so that its upper surface becomes flush with the upper surface of the center part of the base unit 310.

Further, a mobile part mounting part 312 is provided to each side surface of the thin-width part at each end part of the base unit 310, and an opening is formed in the mobile part mounting part 312. End parts 313 of axles to which the mobile part 340 or 350 is coupled are exposed from the openings.

One pair of the two pairs of axles corresponding to the thin-width parts on both ends of the base unit 310 are configured to be steerable, and the one pair of the two pairs of axles are driving axles which are driven by a driving source (not illustrated) and the other pair of axles are driven axles. Note that both of the pairs of axles may be driving axles. The driving source is comprised of a motor, for example.

A battery 328 and a robot controller 1201 are mounted on the base unit 310. The battery 328 supplies electric power for operating the mobile robot 1000. The robot controller 1201 is configured similarly to the robot controller 201 of Embodiment 1.

Note that, if crawlers are attached to the base unit 310 as the mobile part 340C, the base unit 310 is formed to have a thin width throughout its length, and the robotic-arm part mounting part 311 is formed integrally with the main body (inrotatable). Further, one pair of axles are configured to be non-steering axles. Note that, also in this case, the robotic-arm part mounting part 311 may be configured to be rotatable, and the robotic-arm part 320 may be configured to be attachable to the robotic-arm part mounting part 311.

Further, as for the base unit 310, if the mobile part 350 (second robotic arm) is attached to the mobile part mounting part 312, each axle is driven individually by the motor as a base-end link of the robotic arm, while being position-controlled.

(Robotic-Arm Part 320)

The robotic-arm part 320 is a robotic-arm part which constitutes the self-propelled robot 30A. In order to handle the package to be delivered, since it is necessary to lift the package to a certain height, the robotic-arm part 320 is provided with a torso part 321 extending upwardly perpendicular to the upper surface of the robotic-arm part mounting part 311. A pair of robotic arms 322 are provided to a top part of the torso part 321. Each robotic arm 322 is comprised of an articulated robotic arm (here, multiple-joint arm). Note that the configuration of the robotic arm is not limited in particular, and it may be a horizontal articulated arm (so-called "SCARA arm") besides the vertical articulated arm. A hand 322a is attached to a tip end of the robotic arm 322. The configuration of the hand 322a is not limited in particular. Here, the hand 322a is comprised of a suction hand which sucks an object using vacuum. For example, the hand 322a may be comprised of a hand which pinches the object from both sides.

A customer's display 323 is provided to the top of the torso part 321. The customer's display 323 is provided with a customer microphone 324, a customer speaker 325, and a field-of-view camera 326. By these, a conversation between the self-propelled robot 30A and the addressee (customer) at the address for delivery becomes possible.

Upon delivery, the self-propelled robot 30A is coupled to the wagon 360 which accommodates the package to be delivered (see FIGS. 17 to 19). Without traveling by itself, the wagon 360 travels by being pushed or pulled by the self-propelled robot 30A. Below, a front-and-rear direction in the traveling direction of the wagon 360 is referred to as a front-and-rear direction of the wagon 360. The wagon 360 is provided with a main body 361 which is comprised of a rectangular parallelepiped box. An interior space of this main body 361 is an accommodation space of the package to be delivered.

The main body 361 has a stepped part 365 which is dented forward in a lower part of a rear end surface. An opening-and-closing door 364 is provided to the rear surface of the main body 361, above the stepped part 365. This opening-and-closing door 364 is for taking the package to be delivered in and out of the package accommodation space of the main body 361.

Wheels 362 are provided to four corners of a bottom part of the main body 361, respectively.

A pair of coupling parts 361a which are comprised of protrusions are provided to both side surfaces of the main body 361. Coupling holes (not illustrated), each comprised of a hole with a bottom, which accept the pair of hands 332a of the self-propelled robot 30A, respectively, are formed in a rear end surface of the pair of coupling parts 361a. The self-propelled robot 30A is coupled to the wagon 360 by inserting the pair of hands 332a into the pair of coupling holes, and sucking the bottoms of the coupling holes. Note that the coupling structure of the coupling part 361a to the hand 322a is not limited to this structure. The coupling structure may be any structure, as long as it is capable of coupling the coupling parts 361a to the hands 322a, and, for example, mutually-engagement parts may be provided to the coupling parts 361a and the hands 322a so that they are coupled together.

The wagon 360 is further provided with a battery 363. The coupling part 361a is provided with a first electric contact (not illustrated) electrically connected to the battery 363, and the hand 322a of the self-propelled robot 30A is provided with a second electric contact (not illustrated) electrically connected to the battery 328. When the self-propelled robot 30A is coupled to the wagon 360, the first electric contact contacts the second electric contact to allow a flow of electric current so that the battery 328 of the self-propelled robot 30A is charged by the battery 363 of the wagon 360. This charging is appropriately performed by a control of the base unit 310 by the robot controller 1201, as needed. Therefore, a travelable distance of the self-propelled robot 30A becomes longer than the case where the wagon 360 is not provided with the battery 363.

(Mobile Part 340)

The mobile part 340 is comprised of three kinds of traveling parts which propels the mobile robot 1000.

A first mobile part 340A is comprised of an indoor tire as a first traveling part. The indoor tire is formed, for example, so that the irregularity of the tread (traveling surface) is comparatively small. The indoor tire is attached to the base unit 310 so that its rotation shaft is coupled to the end part 313 of the axle of the mobile part mounting part 312 of the base unit 310.

A second mobile part 340B is comprised of an outdoor tire as a second traveling part. The outdoor tire is formed so that the irregularity of the tread (traveling surface) is comparatively large. Further, a suspension is attached to the tire. The outdoor tire is attached to the base unit 310 so that its rotation shaft is coupled to the end part 313 of the axle of the mobile part mounting part 312 of the base unit 310. Further, the suspension is suitably coupled to the base unit 310.

A third mobile part 340C is comprised of a crawler (caterpillar) as a third traveling part. The crawler is attached to the base unit 310 so that its drive mechanism is coupled to the end part 313 of the axle of the mobile part mounting part 312 of the base unit 310.

(Robotic-Arm Part 330)

The robotic-arm part 330 is a robotic-arm part which constitutes the high-place walking robot 30B. The robotic-arm part 330 includes a pair of robotic arms 331 (first robotic arms). Each robotic arm 331 is comprised of an articulated robotic arm (here, six-axis robotic arm). A hand 331a (first robot hand) is attached to a tip end of the robotic arm 331. The configuration of the hand 331a is not limited in particular. Here, the hand 331a is comprised of a suction hand which sucks an object using vacuum. For example, the hand 331a may be comprised of a hand which pinches the object.

Since the robotic-arm part 330 requires a long horizontally-extending arm in order to perform maintenance at the heights, the two robotic arms 331 are directly attached to the robotic-arm part mounting part 311 of the base unit 310. Therefore, the two robotic arms 331 are extendable near and along the upper surface of the base unit 310. Further, since it is necessary to lift the high-place walking robot 30B up to the height, the robotic-arm part 330 is configured so that the robotic arms 331 are foldable compactly (see FIGS. 20 and 21).

The robotic-arm part 330 further includes the field-of-view camera 326. The field-of-view camera 326 is also directly attached to the robotic-arm part mounting part 311 of the base unit 310. A microphone and a speaker for cooperation with a field worker and gathering circumference information may also be provided.

(Mobile Part 350)

The mobile part 350 (second robotic arm) is comprised of two kinds of legs which make the mobile robot 1000 perform a height walk.

A fourth mobile part 350A is comprised of a short leg as a first leg. The short leg is comprised of a five-axis robotic arm, for example. As for the five-axis robotic arm, a base-end link 354 corresponds to a root part of the leg, and a tip-end part 352 (second robot hand) corresponds to a foot part of the leg. The base-end link 354 is coupled to the end part 313 of the axle of the mobile part mounting part 312 of the base unit 310. The tip-end part 352 is configured to be twistable to the coupling link. The tip-end part 352 is configured to stick to an object. Here, the tip-end part 352 is provided with an electromagnet so that, by turning on the electromagnet, the tip-end part 352 sticks to a magnetic object, and by turning off the electromagnet, the tip-end part 352 is released from the magnetic object. Therefore, while the tip-end part 352 sticks and is fixed to the object in a state where the twist rotation axis of the tip-end part 352 is parallel to the rotation axis of the base-end link 354, and the twist rotation of the tip-end part 352 is compliance-controlled, when the base-end link 354 is rotated, the base unit 310 moves in the opposite direction from the rotation direction. Therefore, as will be described later, the high-place walking robot 30B can walk like a caterpillar (measuring worm).

The fourth mobile part 350A further includes a hollow fixed cover member 353. The fixed cover member 353 is fixed to the mobile part mounting part 312 of the base unit 310 so that the base-end link 354 rotatably penetrates therethrough. Therefore, the short leg is attached to the base unit 310.

A fifth mobile part 350B is comprised of a long leg as a second leg. The long leg is comprised of a seven-axis robotic arm, for example. Other configurations are similar to those of the fourth mobile part 350A.

(First Configuration and Use Mode of Self-Propelled Robot 30A)

Referring to FIG. 17, in the first configuration of the self-propelled robot 30A, the robotic-arm part 320 is attached to the robotic-arm part mounting part 311 of the base unit 310, and the indoor tire of the first mobile part 340A is attached to each mobile part mounting part 312 of the base unit 310. Therefore, a delivery robot for indoor traveling is configured as the first configuration of the self-propelled robot 30A.

The self-propelled robot 30A is used for conveying packages at a collection-and-delivery base (collection-and-delivery center), for example. In this case, the self-propelled robot 30A performs the following collection-and-delivery work, for example.

First, the self-propelled robot 30A coupled itself to the wagon 360 by inserting the pair of hands 322a of the pair of robotic arms 322 into the coupling holes of the pair of coupling parts 361a of the wagon 360, and sucking the bottoms of the coupling holes by the hands 322a. At this time, the battery 328 of the self-propelled robot 30A is charged by the battery 363 of the wagon 360. Further, the front end part of the self-propelled robot 30A is located in the stepped part 365 of the rear surface of the wagon 360, and the self-propelled robot 30A approaches and is coupled to the wagon 360.

Next, the self-propelled robot 30A travels by itself to a bulk storage, while pushing and pulling the wagon 360. Next, the self-propelled robot 30A stops the suction of the pair of hands 322a, pulls the pair of hands 322a out of the coupling holes of the pair of coupling parts 361a of the wagon 360, and releases the wagon 360 therefrom. Next, the self-propelled robot 30A loads the packages into the wagon 360 by itself. That is, the robot which conveys the package is the same as the robot which loads and unloads the package. In detail, the self-propelled robot 30A uses the pair of robotic arms 322 to open the opening-and-closing door 364 of the wagon 360, holds the package (not illustrated in FIG. 17) placed in the bulk storage by the pair of hands 322a of the pair of robotic arms 322, and places it inside the accommodation space of the wagon 360. Here, the self-propelled robot 30A performs this process, while rotating the torso part 321, as needed. When the necessary packages are accommodated in the wagon 360, the self-propelled robot 30A closes the opening-and-closing door 364, couples itself to the wagon 360, and travels by itself to a given location.

Then, if needed, the self-propelled robot 30A performs the process in the reversed order to release the wagon 360 therefrom and pick out the package from the wagon 360.

In the above-described work, if needed, the self-propelled robot 30A will have a conversation with a person by using the customer's display 323, the customer microphone 324, the customer speaker 325, and the field-of-view camera 326.

(Second Configuration and Use Mode of Self-Propelled Robot 30A)

Referring to FIG. 18, in the second configuration of the self-propelled robot 30A, the robotic-arm part 320 is attached to the robotic-arm part mounting part 311 of the base unit 310, and the outdoor tire of the second mobile part 340B is attached to each mobile part mounting part 312 of the base unit 310. Therefore, a delivery robot for outdoor traveling is configured as the second configuration of the self-propelled robot 30A.

Since the self-propelled robot 30A of the second configuration has the outdoor tires, it is suitably used as the self-propelled robot for delivery which eventually delivers the package to the receiver's address. Other configurations are similar to those of the first configuration of the self-propelled robot 30A.

(Third Configuration and Use Mode of Self-Propelled Robot 30A)

Referring to FIG. 19, in the third configuration of the self-propelled robot 30A, the robotic-arm part 320 is attached to the robotic-arm part mounting part 311 of the base unit 310, and the crawler of the third mobile part 340C is attached to each mobile part mounting part 312 of the base unit 310. Therefore, a delivery robot for bad terrain traveling is configured as the third configuration of the self-propelled robot 30A.

Since the self-propelled robot 30A of the third configuration has the crawlers, it is suitably used as a self-propelled robot for bad terrain delivery which travels a bad terrain and eventually delivers the package to the receiver's address. Other configurations are similar to those of the first configuration of the self-propelled robot 30A. The bad terrain may be a road during a disaster, and irregular ground, for example. Note that the second configuration of the self-propelled robot 30A changes the direction by slowing down or stopping one of the crawlers.

(First Configuration and Use Mode of High-Place Walking Robot 30B)

The high-place walking robot 30B illustrated in FIG. 20 is the first modification of the robot 30 described based on FIGS. 1 to 13. Referring to FIG. 20, in the first configuration of the high-place walking robot 30B, the robotic-arm part 330 is attached to the robotic-arm part mounting part 311 of the base unit 310 (base). In detail, for example, the pair of robotic arms 331 (first robotic arms) are attached to the robotic-arm part mounting part 311 of the base unit 310 so that they are located symmetrically with respect to the rotation axis A300. Then, the field-of-view camera 326 is attached to the robotic-arm part mounting part 311 so that it is located forward of the center of the pair of robotic arms 331. Further, when a microphone and a speaker for cooperation with a field worker and for gathering circumference information are provided, these are suitably attached to the robotic-arm part mounting part 311 or the field-of-view camera 326. Moreover, the short leg of the fourth mobile part 350A is attached to each mobile part mounting part 312 of the base unit 310. Therefore, the maintenance robot which performs maintenance while walking at the heights is configured as the first configuration of the high-place walking robot 30B.

The high-place walking robot 30B of the first configuration is used as follows, for example, similarly to the embodiment described based on FIGS. 1 to 13.

For example, the high-place walking robot 30B is conveyed by the drone to a maintenance site, such as a high-rise building (for example, a steel tower). Then, for example, if a magnetic member used as a scaffold (hereinafter, referred to as "the scaffold member") 371 (for example, a horizontal beam member of the steel tower) exists in the high-rise structure, the high-place walking robot 30B makes the tip-end part 352 (second robot hand) of each short leg stick to the side surface of the scaffold member 371. Then, while checking a target object (for example, a wire rod) 372 by the field-of-view camera 326, it performs necessary maintenance, while sticking to and holding the target object by the pair of hands 331a of the pair of robotic arms 331.

In this case, the high-place walking robot 30B walks as follows.

For example, in a state where the high-place walking robot 30B has a little gap with the scaffold member 371, it sticks the tip-end part 352 of each short leg to the scaffold member 371 while the twist rotation axis of the tip-end part 352 is parallel to the rotation axis of the base-end link 354, and rotates the base-end link 354 rearward. while the twist rotation of the tip-end part 352 is compliance-controlled. Then, the base unit 310 moves forward and downward by the principle of "parallel link." When the base unit 310 contacts the scaffold member 371, the high-place walking robot 30B moves the tip-end parts 352 of the two pairs of short legs forward, and the sticking and fixing are performed similarly to the above. Then, similarly to the above, when the base-end link 354 is rotated rearward, the base unit 310 moves upward while moving forward, and the moves downward to contact the scaffold member 371. Subsequently, by repeating this operation, the high-place walking robot 30B walks like a caterpillar.

Note that, if the scaffold member 371 is not horizontal, the high-place walking robot 30B can walk like a caterpillar by moving the four short legs forward one by one, while maintaining a so-called "three-point support" state of the short legs.

(Second Configuration and Use Mode of High-Place Walking Robot 30B)

The high-place walking robot 30B illustrated in FIG. 21 is the second modification of the robot 30 described based on FIGS. 1 to 13. Referring to FIG. 21, in the second configuration of the high-place walking robot 30B, the robotic-arm part 330 is attached to the robotic-arm part mounting part 311 of the base unit 310, similarly to the above. Then, the long leg of the fifth mobile part 350B is attached to each mobile part mounting part 312 of the base unit 310. Thus, the maintenance robot which performs maintenance while walking at the heights is configured as the second configuration of the high-place walking robot 30B.

Since the high-place walking robot 30B of the second configuration has the longer and thicker long leg than the short leg, it can perform more extensive maintenance.

(Moving Mode of High-Place Walking Robot 30B on Steel Tower)

Finally, one example of a mode of the high-place walking robot 30B illustrated in FIG. 20 for moving on the steel tower is described based on FIGS. 22A-22D. Here, one example of a mode in which the high-place walking robot 30B moves on the scaffold member 371 of the steel tower (corresponding to a cross arm Tb of the steel tower T in the embodiment described based on FIGS. 1 to 13) in the moving direction illustrated in FIGS. 22A-22D is described.

Figure 22A:
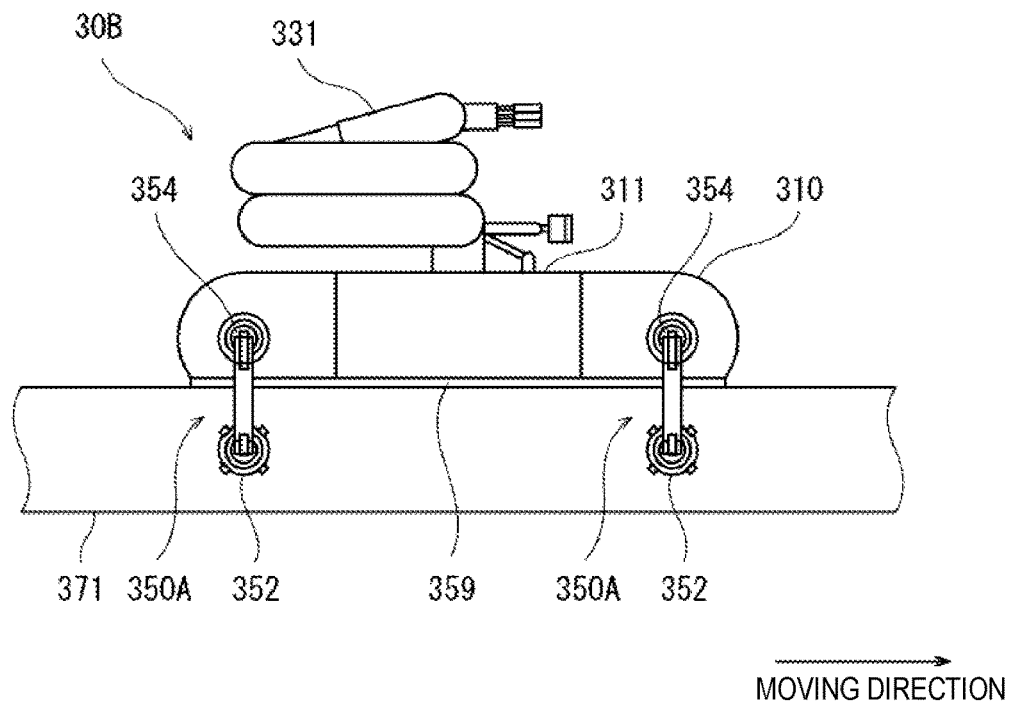
FIG. 22A is a schematic view illustrating one example of a mode in which the maintenance robot of FIG. 20 moves on the steel tower, and is a side view illustrating an initial state.

First, as illustrated in FIG. 22A, the high-place walking robot 30B feeds current to an electromagnet 359 provided underneath the base unit 310 to stick the base unit 310 to an upper surface of the scaffold member 371 by an electromagnetic force of the electromagnet 359. Further, the high-place walking robot 30B feeds current to the tip-end parts 352 provided to the tip ends of the four mobile parts 350A to stick the four mobile parts 350A to the side surfaces of the scaffold member 371 by the electromagnetic forces of the tip-end parts 352. As described above, the high-place walking robot 30B can stick itself to the scaffold member 371. Then, the high-place walking robot 30B is capable of performing the work to the steel tower in this state by using the pair of robotic arms 331 and the pair of hands 331a.

Next, while sticking the base unit 310 to the upper surface of the scaffold member 371, the high-place walking robot 30B stops the feeding of current to the four tip-end parts 352 to release the four mobile parts 350A from the side surfaces of the scaffold member 371.

Figure 22B:
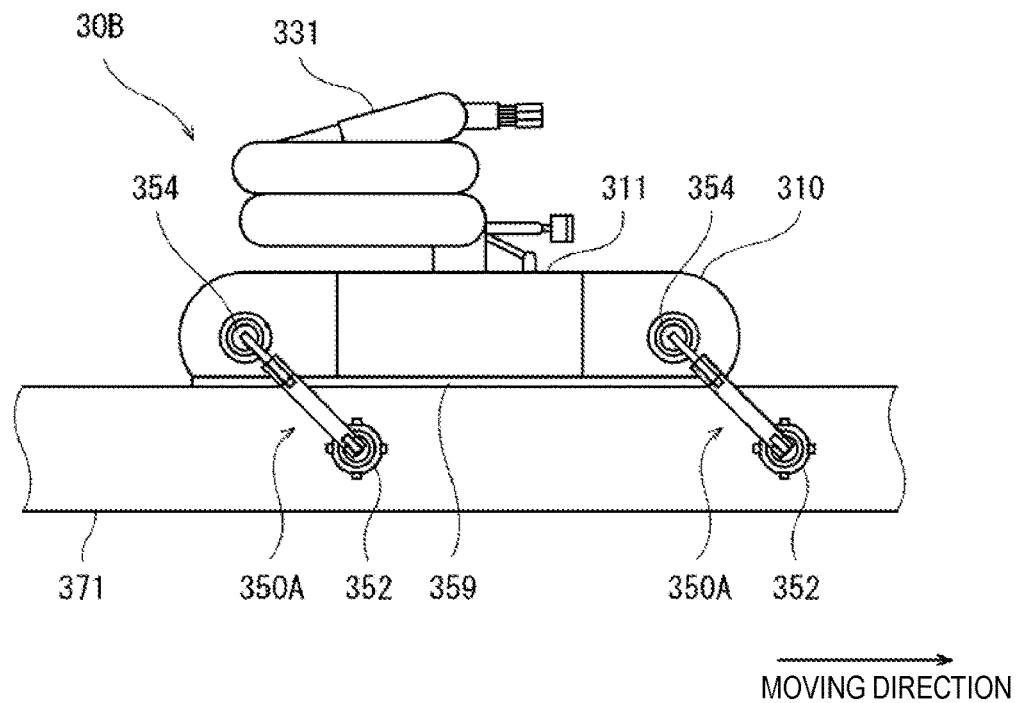
FIG. 22B is a schematic view illustrating one example of a mode in which the maintenance robot of FIG. 20 moves on the steel tower, and is a side view when moving a sticking mechanism of a leg in the moving direction.

Further, as illustrated in FIG. 22B, while sticking the base unit 310 to the upper surface of the scaffold member 371 by the electromagnetic force of the electromagnet 359, the high-place walking robot 30B rotates the four base-end links 354 by the mutually same angle so that the four tip-end parts 352 move in the moving direction by the mutually same distance. Further, as illustrated in this drawing (FIG. 22B), the high-place walking robot 30B rotates the joint axes of the four mobile parts 350A provided to the center part in the longitudinal direction so that the four mobile parts 350A become longer than in the state illustrated in FIG. 22A in the side view. Therefore, the four tip-end parts 352 become at the same height as the state illustrated in FIG. 22A.

Then, as illustrated in this drawing (FIG. 22B), the high-place walking robot 30B again feeds current to the four tip-end parts 352 to stick the four mobile parts 350A to parts of the side surfaces of the scaffold member 371 forward in the moving direction from the state illustrating in FIG. 22A, by the electromagnetic forces of the tip-end parts 352.

Next, while sticking the four mobile parts 350A to the side surfaces of the scaffold member 371 by the electromagnetic forces of the four tip-end parts 352, the high-place walking robot 30B stops the feeding of current to the electromagnet 359 to release the base unit 310 from the upper surface of the scaffold member 371.

Figure 22C:
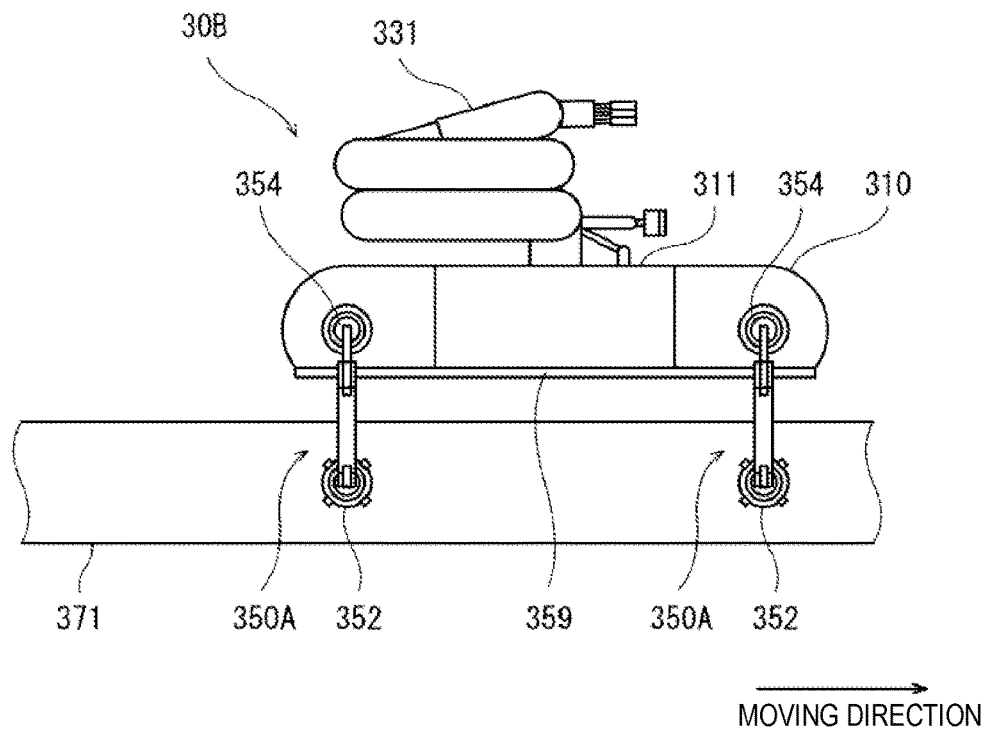
FIG. 22C is a schematic view illustrating one example of a mode in which the maintenance robot of FIG. 20 moves on the steel tower, and is a side view when moving the robot in the moving direction while separating its base from the steel tower.

Further, as illustrated in FIG. 22C, while sticking the four mobile parts 350A to the side surfaces of the scaffold member 371 by the electromagnetic forces of the four tip-end parts 352, the high-place walking robot 30B rotates the four base-end links 354 by the mutually same angle so that the four mobile parts 350A extend vertically (i.e., the four base-end links 354 are located at the same positions as the corresponding tip-end parts 352 in the moving direction). Thus, as illustrated in this drawing (FIG. 22C), the bottom of the base unit 310 separates from the upper surface of the scaffold member 371, and the base unit 310 moves in the moving direction forward from the state illustrated in FIGS. 22A and 22B.

Figure 22D:
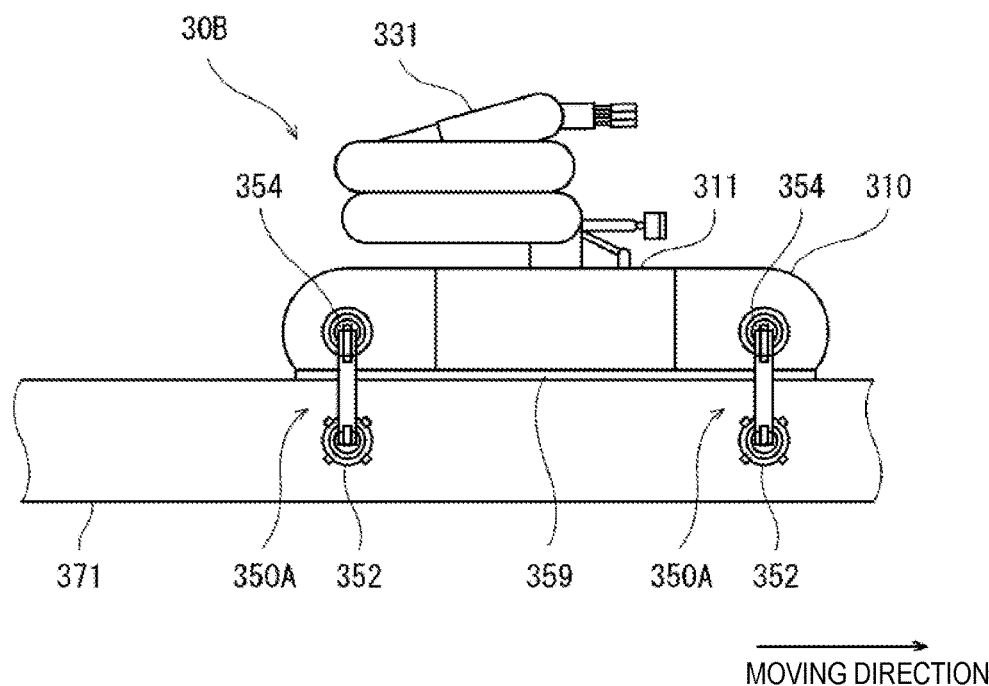
FIG. 22D is a schematic view illustrating one example of a mode in which the maintenance robot of FIG. 20 moves on the steel tower, and is a side view when the movement of the maintenance robot in the moving direction is finished.

Then, as illustrated in FIG. 22D, while sticking the four mobile parts 350A to the side surfaces of the scaffold member 371 by the electromagnetic forces of the four tip-end parts 352, the high-place walking robot 30B rotates the joint axes of the four mobile parts 350A provided to the center part in the longitudinal direction so that the four mobile parts 350A become the same length as the state illustrated in FIG. 22A in the side view. Therefore, the bottom of the base unit 310 again contacts the upper surface of the scaffold member 371.

Finally, as illustrated in this drawing (FIG. 22D), while sticking the four mobile parts 350A to the side surfaces of the scaffold member 371 by the electromagnetic forces of the four tip-end parts 352, the high-place walking robot 30B again feeds current to the electromagnet 359 provided to the bottom of the base unit 310 to again stick the base unit 310 to the upper surface of the scaffold member 371 by the electromagnetic force of the electromagnet 359. As described above, the high-place walking robot 30B is capable of moving in the moving direction on the scaffold member 371.

Note that, in the description above based on FIGS. 22A-22D, the high-place walking robot 30B moves on the scaffold member 371 which extends horizontally of the steel tower. However, without being limited to this case, the high-place walking robot 30B is also movable in a similar manner on a main post which extends vertically of the steel tower.

Further, in the description above based on FIGS. 22A-22D, the four mobile parts 350A stick to the side surfaces of the scaffold member 371 by the electromagnetic force. However, without being limited to this case, a hand which can grasp a part of the steel tower may be provided to the tip end of each of the four legs, and the high-place walking robot 30B may be fixed to the steel tower by grasping the part of the steel tower by the hands.

(Summary)

In order to solve the above-described problem, the work system according to one embodiment of the present disclosure is a work system which performs a work to a structure, and includes an aircraft, and a robot which performs the work to the structure. After the aircraft conveys the robot to the structure while holding the robot, the aircraft releases the robot after the aircraft lowers the robot onto the structure. The robot is released from the aircraft, and then performs the work to the structure.

According to this configuration, in the work system according to the present disclosure, the robot is conveyed to the structure by the aircraft, the robot is lowered onto the structure from the aircraft, the robot is released from the aircraft, and then the work is performed to the structure by the robot. Therefore, it becomes possible to perform the work to the structure.

The robot may include a robot body and a fixing device which fixes the robot body to the structure. The aircraft may release the robot on the structure after the robot is fixed to the structure by the fixing device.

According to this configuration, since the robot has the fixing device, the robot can perform the work to the structure stably on the structure.

For example, the robot body may include a base, a first robotic arm attached at a base-end part thereof to the base, and a first robot hand which is provided to a tip end of the first robotic arm and performs the work to the structure. The fixing device may be provided to the base.

For example, the fixing device may include a second robotic arm attached at a base-end part thereof to the base, and a second robot hand provided to a tip end of the second robotic arm. The fixing device may fix the robot body to the structure by holding a part of the structure by the second robot hand.

The robot may be movable on the structure by repeating operation in which, after the robot holds a part of the structure by the first robot hand, the robot changes a posture of the first robotic arm and holds another part of the structure by the first robot hand.

According to this configuration, the robot can perform the work to the structure while moving on the structure.

By the base being constituted as a travel cart, the robot may be travelable on the structure by itself.

According to this configuration, the robot can perform the work to the structure while traveling by itself on the structure.

The work system may further include an interface for an operator to remotely operate the aircraft and the robot. The operator may remotely perform, using the interface, at least one of that the aircraft lowers the robot onto the structure and that the robot performs the work to the structure.

According to this configuration, as compared with the case of autonomously performing that the aircraft lowers the robot onto the structure and the robot performs the work to the structure, it becomes possible to securely perform these processes.

For example, the robot may include a plurality of robots, and the operator may remotely perform, using the interface, that the plurality of robots perform the work to the structure, while switching the robot to be remotely operated among the plurality of robots.

For example, the aircraft may include a storage device which stores the robot, and convey the robot to the structure while storing the robot inside the storage device.

For example, the aircraft may be a drone.

The robot may include three assembly units comprised of the first robotic arm, the base, and a mobile part which moves the robot, and the first robotic arm may be attached to an upper surface of the base, and the mobile part may be attached to a side surface of the base.

According to this configuration, the robot can be assembled easily.

The base may be configured so that a third robotic arm including a torso part extending perpendicularly from an upper surface of the base, and the first robotic arm which is directly attached to the upper surface of the base and is extendable near and along the upper surface of the base, are selectively attached to the upper surface, and a traveling part which propels the robot, and the second robotic arm which makes the robot walk at a high location, are selectively attached to the side surface.

According to this configuration, by attaching the third robotic arm to the upper surface of the base and attaching the traveling part to the side surface of the base, for example, a delivery robot can be configured. Alternatively, by attaching the fourth robotic arm part to the upper surface of the base and attaching the second robotic arm to the side surface of the base, for example, a high-place walking robot for maintenance of a high-rise structure can be configured.

In order to solve the above-described problem, the work method according to one embodiment of the present disclosure is a work method which performs a work to a structure, and includes a first step in which an aircraft and a robot that performs the work to the structure are prepared, a second step in which, after performing the first step, the robot is held by the aircraft, a third step in which, after performing the first and second steps, the robot is conveyed to the structure by the aircraft, a fourth step in which, after performing the first to third steps, the robot is lowered onto the structure from the aircraft, a fifth step in which, after performing the first to fourth steps, the robot is released from the aircraft, and a sixth step in which, after performing the first to fifth steps, the work is performed to the structure by the robot.

According to this configuration, in the work method according to the present disclosure, the robot is conveyed to the structure by the aircraft, the robot is lowered onto the structure from the aircraft, the robot is released from the aircraft, and then the work is performed to the structure by the robot. Therefore, it becomes possible to perform the work to the structure.

The invention claimed is:

1. A work system that performs a work on a structure, comprising:
   an aircraft; and
   a robot that is configured to perform the work on the structure,
   wherein, after the aircraft conveys the robot to the structure while holding the robot, the aircraft is configured to release the robot after the aircraft lowers the robot onto the structure,
   the robot includes a robot body and a fixing device that is configured to fix the robot body to the structure,
   the aircraft is configured to release the robot on the structure after the robot is fixed to the structure by the fixing device,
   the robot body includes a base, a first robotic arm attached at a base-end part thereof to the base, and a first robot hand that is provided at a tip end of the first robotic arm and is configured to perform the work on the structure,
   the fixing device is provided to the base,
   the fixing device includes a second robotic arm attached at a base-end part thereof to the base, and a second robot hand provided at a tip end of the second robotic arm, and
   the fixing device is configured to fix the robot body to the structure by grasping and clenching a part of the structure with the second robot hand.

2. The work system of claim 1, wherein the robot is configured to move on the structure by repeating an operation in which, after the robot holds a part of the structure by the first robot hand, the robot changes a posture of the first robotic arm and holds another part of the structure by the first robot hand.

3. The work system of claim 1, wherein, the base is configured as a travel cart, and the robot is configured to travel on the structure by itself.

4. The work system of claim 1, further comprising an interface for an operator to remotely operate the aircraft and the robot,
   wherein the operator remotely performs, using the interface, at least one operation of controlling the aircraft to lower the robot onto the structure and controlling the robot to perform the work to on the structure.

5. The work system of claim 4, wherein the robot includes a plurality of robots, and
   wherein the operator remotely controls, using the interface, the plurality of robots to perform the work on the structure, and the interface is configured to switch the robot to be remotely operated from among the plurality of robots.

6. The work system of claim 1, wherein the aircraft includes a storage device that stores the robot, and the aircraft is configured to convey the robot to the structure while storing the robot inside the storage device.

7. The work system of claim 1, wherein the aircraft is a drone.

8. The work system of claim 1, wherein the robot includes three assembly units comprised of the first robotic arm, the base, and a mobile part that moves the robot, and
   wherein the first robotic arm is attached to an upper surface of the base, and the mobile part is attached to a side surface of the base.

9. The work system of claim 8, wherein the base is configured so that:
- a third robotic arm including a torso part extending perpendicularly from an upper surface of the base, and the first robotic arm that is directly attached to the upper surface of the base and is extendable near and along the upper surface of the base, are selectively attached to the upper surface, and
- a traveling part that propels the robot, and the second robotic arm that makes the robot walk at a high location, are attached to the side surface.

10. A work method that performs a work on a structure with an aircraft and a robot, wherein the robot includes a robot body and a fixing device that is configured to fix the robot body to the structure, the aircraft is configured to release the robot on the structure after the robot is fixed to the structure by the fixing device, the robot body includes a base, a first robotic arm attached at a base-end part thereof to the base, and a first robot hand that is provided at a tip end of the first robotic arm and is configured to perform the work on the structure, the fixing device is provided to the base, the fixing device includes a second robotic arm attached at a base-end part thereof to the base, and a second robot hand provided at a tip end of the second robotic arm, and the fixing device is configured to fix the robot body to the structure by grasping and clenching a part of the structure with the second robot hand, the work method comprising the steps of:
- a first step in which an aircraft and a robot that performs the work to-on the structure are prepared;
- a second step in which, after performing the first step, the robot is held by the aircraft;
- a third step in which, after performing the first and second steps, the robot is conveyed to the structure by the aircraft;
- a fourth step in which, after performing the first to third steps, the robot is lowered onto the structure from the aircraft;
- a fifth step in which, after performing the first to fourth steps, the robot is released from the aircraft; and
- a sixth step in which, after performing the first to fifth steps, the work is performed on the structure by the robot.

* * * * *